US010246074B2

(12) United States Patent
Sato

(10) Patent No.: US 10,246,074 B2
(45) Date of Patent: Apr. 2, 2019

(54) HYBRID VEHICLE

(71) Applicant: Toyota Jidosha Kabushiki Kaisha, Toyota-shi Aichi-ken (JP)

(72) Inventor: Keita Sato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 367 days.

(21) Appl. No.: 15/345,594

(22) Filed: Nov. 8, 2016

(65) Prior Publication Data

US 2017/0137013 A1 May 18, 2017

(30) Foreign Application Priority Data

Nov. 12, 2015 (JP) ................. 2015-222054

(51) Int. Cl.
| | |
|---|---|
| *B60W 20/10* | (2016.01) |
| *B60K 6/28* | (2007.10) |
| *B60K 6/365* | (2007.10) |
| *B60K 6/383* | (2007.10) |
| *B60K 6/445* | (2007.10) |
| *B60L 15/00* | (2006.01) |
| *B60W 30/18* | (2012.01) |
| *B60L 3/10* | (2006.01) |

(52) U.S. Cl.
CPC ............ *B60W 20/10* (2013.01); *B60K 6/28* (2013.01); *B60K 6/365* (2013.01); *B60K 6/383* (2013.01); *B60K 6/445* (2013.01); *B60L 3/10* (2013.01); *B60L 15/007* (2013.01); *B60W 30/18172* (2013.01); *B60L 2240/465* (2013.01); *B60L 2240/647* (2013.01); *B60W 2510/244* (2013.01); *B60W 2540/10* (2013.01); *B60W 2540/103* (2013.01); *B60W 2550/148* (2013.01); *B60Y 2200/92* (2013.01); *Y02T 10/6239* (2013.01); *Y02T 10/6269* (2013.01); *Y02T 10/7258* (2013.01); *Y02T 10/7291* (2013.01); *Y02T 90/16* (2013.01); *Y10S 903/91* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 7,734,401 B2 * | 6/2010 | Joe ..................... | B60K 6/445 701/54 |
| 9,751,520 B2 * | 9/2017 | Chae .................. | B60W 20/00 |
| 2008/0173485 A1 * | 7/2008 | Kumazaki .......... | B60K 6/365 180/65.28 |

(Continued)

FOREIGN PATENT DOCUMENTS

| | | |
|---|---|---|
| JP | 2003-343304 A | 12/2003 |
| JP | 2008-149978 A | 7/2008 |

(Continued)

*Primary Examiner* — Shelley Chen
(74) *Attorney, Agent, or Firm* — Dinsmore & Shohl LLP

(57) ABSTRACT

When a hybrid vehicle travels in CS mode in EV single-drive mode, when a required torque is larger than a torque threshold or when a required power is larger than a power threshold, and when a predetermined high response request is not being issued, a drive mode is caused to shift into HV drive mode. When the predetermined high response request is being issued, the drive mode is caused to shift into EV double-drive mode.

4 Claims, 11 Drawing Sheets

(56) References Cited

U.S. PATENT DOCUMENTS

| | | | |
|---|---|---|---|
| 2013/0096763 A1* | 4/2013 | Izumi | B60R 16/03 701/22 |
| 2013/0226389 A1* | 8/2013 | Yamazaki | B60K 6/445 701/22 |
| 2013/0253744 A1* | 9/2013 | Nishimine | B60W 10/08 701/22 |
| 2014/0350764 A1* | 11/2014 | Arai | B60W 40/10 701/22 |
| 2015/0006007 A1* | 1/2015 | Kitahata | B60K 6/442 701/22 |
| 2015/0046009 A1* | 2/2015 | Maruyama | B60K 6/445 701/22 |
| 2015/0087457 A1* | 3/2015 | Hayashi | B60K 6/365 475/2 |
| 2015/0141198 A1* | 5/2015 | Tomo | B60W 10/02 477/5 |
| 2015/0197244 A1* | 7/2015 | Kato | B60W 20/10 701/22 |
| 2015/0367833 A1* | 12/2015 | Maeda | B60K 6/54 701/22 |
| 2016/0221570 A1* | 8/2016 | Chen | B60W 30/182 |
| 2018/0201116 A1* | 7/2018 | Miyagawa | B60K 6/442 |

FOREIGN PATENT DOCUMENTS

| | | |
|---|---|---|
| JP | 2008-230409 A | 10/2008 |
| JP | 4228970 B2 * | 2/2009 |
| JP | 2010221979 A | 10/2010 |
| JP | 2013-147193 A | 8/2013 |

* cited by examiner

HYBRID VEHICLE

CROSS-REFERENCE TO RELATED APPLICATIONS

This application claims priority to Japanese Patent Application No. 2015-222054 filed on Nov. 12, 2015, the entire contents of which are hereby incorporated by reference.

BACKGROUND

1. Technical Field

The present disclosure relates to a hybrid vehicle.

2. Description of Related Art

Conventionally, there is suggested a hybrid vehicle (see, for example, Japanese Patent Application Publication No. 2013-147193 (JP 2013-147193 A). In this hybrid vehicle, a first rotary electric machine is connected to a sun gear of a planetary gear, an engine is connected to a carrier, a drive shaft is connected to a ring gear, a second rotary electric machine is connected to the drive shaft, a one-way clutch is connected to the carrier and a battery is electrically connected to the first rotary electric machine and the second rotary electric machine. The hybrid vehicle selectively travels in EV drive mode or HV drive mode in charge depleting (CD) mode or charge sustaining (CS) mode. The CD mode is, for example, a mode in which consumption of electric power of the battery is permitted, and is selected when a state of charge of the battery is higher than or equal to a threshold. The CS mode is, for example, a mode in which the state of charge of the battery is kept within a certain range, and is selected when the state of charge of the battery is lower than the threshold. The EV drive mode is a mode in which the hybrid vehicle travels by using at least one of the first rotary electric machine and the second rotary electric machine as a power source. The EV drive mode includes a single-drive mode and a double-drive mode. In the single-drive mode, only the second rotary electric machine is used as a power source. In the double-drive mode, the first rotary electric machine and the second rotary electric machine are used as power sources. The HV drive mode is a mode in which the hybrid vehicle travels by using the engine as a power source.

A hybrid vehicle, particularly, a plug-in hybrid vehicle, basically travels in the EV drive mode and, when a required output (torque, power) for propelling the hybrid vehicle is relatively large, shifts into the HV drive mode to meet the required output. When the hybrid vehicle shifts from the EV drive mode to the HV drive mode, the hybrid vehicle is required to start the engine, so it is inconvenient that it takes a certain time until the engine functions as a power source.

SUMMARY

In the above-described plug-in hybrid vehicle, when the double-drive mode (specifically described later) is possible in a state where the required output has increased in the EV single-drive mode (specifically described later), it is allowed to select whether to shift into the double-drive mode or shift into the HV drive mode. According to the existing control, in the CD mode, the drive mode is caused to shift into the double-drive mode in order to give a higher priority to the EV drive mode; whereas, in the CS mode, the drive mode is caused to shift into the HV drive mode in order to reduce a decrease in the state of charge of the battery. In the CS mode, even when a high response request is being issued, for example, when a driver has depressed an accelerator pedal by a relatively large amount, the drive mode is caused to shift into the HV drive mode, so there is a possibility that the plug-in hybrid vehicle does not sufficiently meet the request. The present disclosure provides a hybrid vehicle that further appropriately meets a high response request when the high response request is being issued in CS mode and single-drive mode.

An aspect of the present disclosure provides a hybrid vehicle. The hybrid vehicle includes an engine, a first motor, a second motor, a planetary gear set, a rotation restriction mechanism, a battery and an electronic control unit. The planetary gear set includes at least one planetary gear. At least part of rotating elements of the at least one planetary gear are connected to the engine, the first motor, the second motor and a drive shaft coupled to an axle. The rotation restriction mechanism is configured to restrict rotation of the engine. The battery is configured to exchange electric power with the first motor and the second motor. The electronic control unit is configured to: (i) control, in one of a charge depleting mode and a charge sustaining mode, the engine, the first motor and the second motor such that the hybrid vehicle travels by using a required output for propelling the hybrid vehicle, according to an accelerator operation, in any one of a hybrid drive mode, a single-drive mode and a double-drive mode, the hybrid drive mode being a mode in which the hybrid vehicle travels while the engine is operated by placing the engine in a rotating state, the single-drive mode being a mode in which the hybrid vehicle travels by using output from only the second motor in an electric drive mode in which the hybrid vehicle travels while the engine is placed in a rotation stopped state to cause the engine not to operate, and the double-drive mode being a mode in which the hybrid vehicle travels by using output from the first motor and the second motor in the electric drive mode, (ii) cause a drive mode to shift into the hybrid drive mode by starting the engine when a predetermined high response request is not being issued, when the required output becomes larger than a first threshold in the charge sustaining mode in the single-drive mode, and (iii) cause the drive mode to shift into the double-drive mode without starting the engine when the predetermined high response request is being issued, when the required output becomes larger than the first threshold in the charge sustaining mode in the single-drive mode.

With the above-described hybrid vehicle, in the CD mode or the CS mode, the engine, the first motor and the second motor are controlled such that the hybrid vehicle travels by using the required output for propelling the hybrid vehicle, commensurate with accelerator operation, in any one of the hybrid drive mode, the single-drive mode and the double-drive mode. In the hybrid drive mode, the hybrid vehicle travels while the engine is operated by placing the engine in the rotating state. In the single-drive mode, the hybrid vehicle travels by using output from only the second motor in the electric drive mode in which the hybrid vehicle travels while the engine is placed in the rotation stopped state to cause the engine not to operate. In the double-drive mode, the hybrid vehicle travels by using output from the first motor and the second motor in the electric drive mode. The CD mode is a drive mode that gives a higher priority to the electric drive mode between the hybrid drive mode and the electric drive mode than the CS mode. When the required output becomes larger than the first threshold in the CS mode in the single-drive mode, the electronic control unit causes the drive mode to shift into the hybrid drive mode by starting the engine when the predetermined high response request is not being issued. In this case, it is possible to reduce a decrease in the state of charge (SOC) of the battery. In contrast, when the required output becomes larger than the first threshold in the CS mode in the single-drive mode, the electronic control unit causes the drive mode to shift into the double-drive mode without starting the engine when the predetermined high response request is being issued. In this case, in comparison with the case where the drive mode is caused to shift into the hybrid drive mode by starting the engine, it is possible to further increase response. That is, it is possible to further appropriately meet the high response request.

The planetary gear set may include a single planetary gear, a sun gear of the planetary gear may be connected to the first motor, a carrier of the planetary gear may be connected to the engine, and a ring gear of the planetary gear may be connected to the drive shaft and the second motor. Alternatively, the planetary gear set may include two planetary gears, a sun gear of the first planetary gear may be connected to the first motor, a carrier of the first planetary gear may be connected to the engine, a ring gear of the first planetary gear may be connected to the drive shaft, a sun gear of the second planetary gear may be connected to the second motor, a carrier of the second planetary gear may be connected to a case (fixed member), and a ring gear of the second planetary gear may be connected to the drive shaft. Alternatively, the planetary gear set may include two planetary gears, a clutch and a brake, a sun gear of the first planetary gear may be connected to the second motor, a carrier of the first planetary gear and a carrier of the second planetary gear may be connected to the drive shaft, a ring gear of the first planetary gear may be connected to the engine, a sun gear of the second planetary gear may be connected to the first motor, the clutch may be configured to connect the sun gear of the first planetary gear and the second motor to the ring gear of the second planetary gear or release the connection therebetween, and the brake may be configured to fix the ring gear of the second planetary gear such that the ring gear is non-rotatable or release the ring gear such that the ring gear is rotatable.

The rotation restriction mechanism may be a one-way clutch that permits rotation of the engine in a positive rotation direction and restricts (prohibits) rotation of the engine in a negative rotation direction or may be a brake that fixes the engine such that the engine is non-rotatable or releases the engine such that the engine is rotatable.

In the above hybrid vehicle according to the present disclosure, the electronic control unit may be configured to cause the drive mode to shift into the hybrid drive mode, when the predetermined high response request is being issued in the charge sustaining mode in the electric drive mode, and when the required output becomes larger than a second threshold larger than the first threshold. Generally, a maximum output outputtable to the drive shaft in the hybrid drive mode is larger than a maximum output outputtable to the drive shaft in the double-drive mode. Therefore, as in the case of the hybrid vehicle, when the predetermined high response request is being issued in the CS mode in the electric drive mode, and when the required output becomes larger than the second threshold, the drive mode is caused to shift into the hybrid drive mode. Thus, when the required output is larger than the second threshold, it is possible to further reliably output the required output to the drive shaft.

In the hybrid vehicle configured to cause the drive mode to shift into the hybrid drive mode when the required output becomes larger than the second threshold when the predetermined high response request is being issued in the CS mode in the electric drive mode, the second threshold may be a value larger than a maximum double-drive output that is a maximum output outputtable to the drive shaft in the double-drive mode. The electronic control unit may be configured to cause the drive mode to shift into the hybrid drive mode even when the required output is not larger than the second threshold, when the required output is larger than the first threshold and the predetermined high response request is being issued in the charge sustaining mode in the electric drive mode, and when the required output is larger than the maximum double-drive output. With the above-described hybrid vehicle, when the required output is larger than the maximum double-drive output and smaller than or equal to the second threshold in the CS mode, it is possible to further reliably output the required output to the drive shaft.

In the hybrid vehicle configured to cause the drive mode to shift into the hybrid drive mode when the required output becomes larger than the second threshold at the time when the predetermined high response request is being issued in the CS mode in the electric drive mode, the electronic control unit may be configured to cause the drive mode to shift into the hybrid drive mode even when the required output is not larger than the second threshold, when the required output is larger than the first threshold and the predetermined high response request is being issued in the charge sustaining mode in the electric drive mode, and when at least one of a condition that the hybrid vehicle is traveling on a predetermined low μ road, a condition that a slip due to wheel spin of a drive wheel has been detected, and a condition that slip reduction control for reducing an extent of the slip is being executed is satisfied. With the thus configured hybrid vehicle, it is possible to prevent occurrence of a slip due to wheel spin of the drive wheel when the hybrid vehicle is traveling on the predetermined low μ road in the CS mode or prevent extension of time to elimination of the slip when a slip due to wheel spin of the drive wheel has been detected or slip reduction control is being executed in the CS mode.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of the present disclosure will be described.

Figure 1:
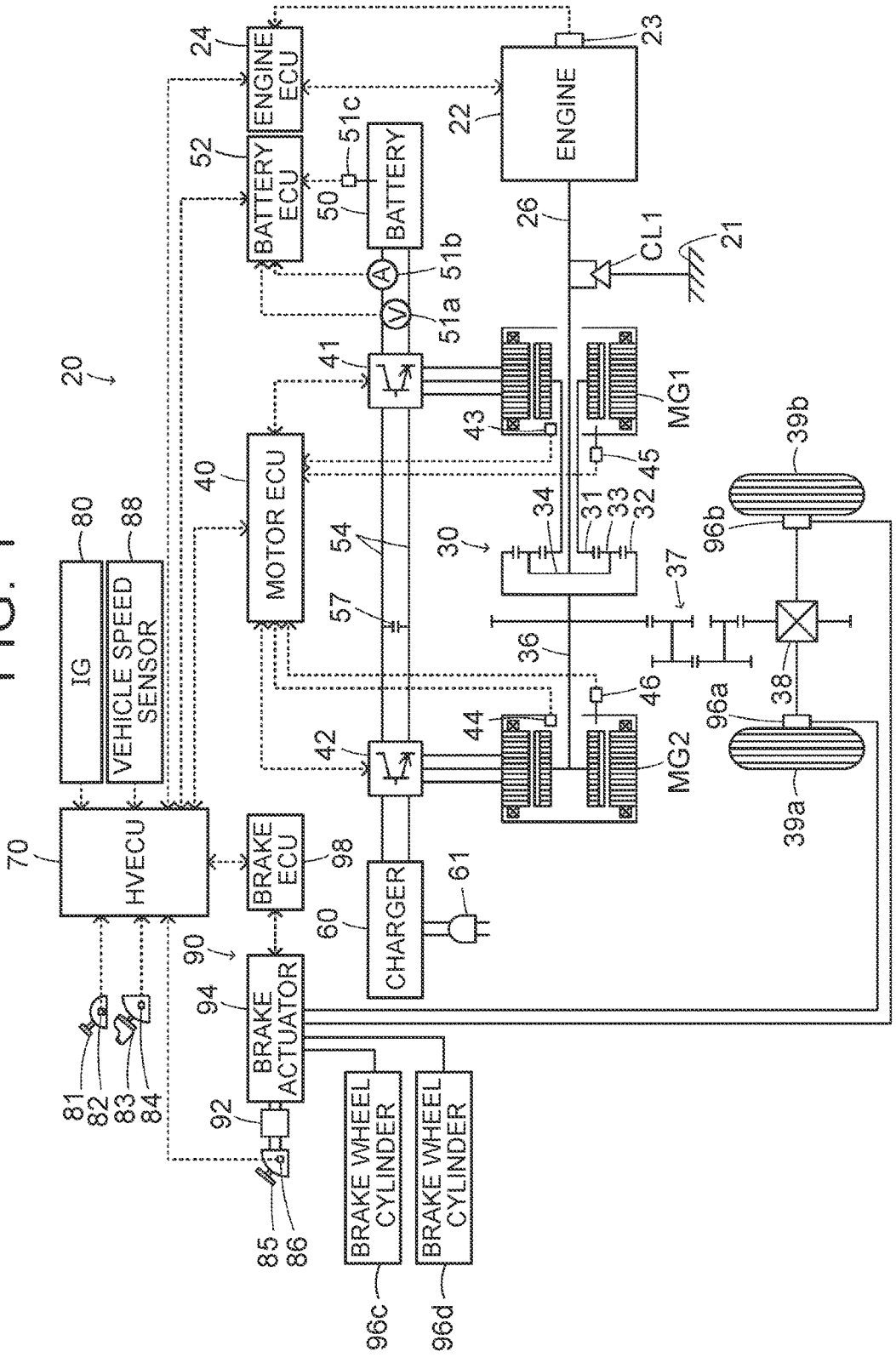
FIG. 1 is a configuration view that schematically shows the configuration of a hybrid vehicle according to a first embodiment of the present disclosure.

FIG. 1 is a configuration view that schematically shows the configuration of a hybrid vehicle 20 according to a first embodiment of the present disclosure. As shown in FIG. 1, the hybrid vehicle 20 according to the first embodiment includes an engine 22, a planetary gear 30 that serves as a planetary gear set, a one-way clutch CL1, motors MG1, MG2, inverters 41, 42, a battery 50, a charger 60, a hydraulic brake device 90 and a hybrid electronic control unit (hereinafter, referred to as HV-ECU) 70.

The engine 22 is configured as an internal combustion engine that outputs power by using gasoline, light oil, or the like, as fuel. The engine 22 undergoes operation control that is executed by an engine electronic control unit (hereinafter, referred to as engine ECU) 24.

Although not shown in the drawing, the engine ECU 24 is a microprocessor that mainly includes a CPU and that further includes a ROM, a RAM, input/output ports and a communication port in addition to the CPU. The ROM stores a processing program. The RAM temporarily stores data.

Signals from various sensors, which are required to execute operation control over the engine 22, are input to the engine ECU 24 via the input port. The signals that are input to the engine ECU 24 include a crank angle θcr and a throttle opening degree TH. The crank angle θcr is input from a crank position sensor 23 that detects a rotation position of a crankshaft 26 of the engine 22. The throttle opening degree TH is input from a throttle valve position sensor that detects a position of a throttle valve.

Various control signals for operation control over the engine 22 are output from the engine ECU 24 via the output port. The signals that are output from the engine ECU 24 include a drive control signal that is output to a throttle motor that adjusts the position of the throttle valve, a drive control signal that is output to a fuel injection valve, and a drive control signal that is output to an ignition coil integrated with an ignitor.

The engine ECU 24 is connected to the HV-ECU 70 via the communication port. The engine ECU 24 executes operation control over the engine 22 in response to a control signal from the HV-ECU 70, and, where necessary, outputs data regarding the operating state of the engine 22 to the HV-ECU 70. The engine ECU 24 computes an angular velocity and rotation speed of the crankshaft 26, that is, an angular velocity ωe and rotation speed Ne of the engine 22, on the basis of the crank angle θcr from the crank position sensor 23.

The planetary gear 30 is a single pinion planetary gear. The planetary gear 30 includes a sun gear 31, a ring gear 32, a plurality of pinion gears 33 and a carrier 34. The sun gear 31 is an external gear. The ring gear 32 is an internal gear. The plurality of pinion gears 33 are in mesh with the sun gear 31 and the ring gear 32. The carrier 34 supports the plurality of pinion gears 33 such that each pinion gear 33 is rotatable and revolvable. The rotor of the motor MG1 is connected to the sun gear 31. A drive shaft 36 is connected to the ring gear 32. The drive shaft 36 is coupled to drive wheels 39a, 39b via a differential gear 38 and a gear mechanism 37. The crankshaft 26 of the engine 22 is connected to the carrier 34.

The one-way clutch CL1 is connected to the crankshaft 26 of the engine 22 and the carrier 34 and also connected to a case 21 fixed to a vehicle body. The one-way clutch CL1 permits the engine 22 to rotate in a positive rotation direction with respect to the case 21, and restricts (prohibits) rotation of the engine 22 in a negative rotation direction with respect to the case 21.

The motor MG1 is, for example, a synchronous generator-motor. As described above, the rotor of the motor MG1 is connected to the sun gear 31 of the planetary gear 30. The motor MG2 is, for example, a synchronous generator-motor. The rotor of the motor MG2 is connected to the drive shaft 36. The inverters 41, 42 are connected to power lines 54. A smoothing capacitor 57 is connected to the power lines 54. Each of the motors MG1, MG2 is driven to rotate under switching control over a plurality of switching elements (not shown) of a corresponding one of the inverters 41, 42, which is executed by a motor electronic control unit (hereinafter, referred to as motor ECU) 40.

Although not shown in the drawing, the motor ECU 40 is a microprocessor that mainly includes a CPU and that further includes a ROM, a RAM, input/output ports and a communication port in addition to the CPU. The ROM stores a processing program. The RAM temporarily stores data.

Signals from various sensors, which are required to execute drive control over the motors MG1, MG2, are input to the motor ECU 40 via the input port. The signals that are input to the motor ECU 40 include rotation positions θm1, θm2, phase currents, temperatures tm1, tm2, and wheel speeds. The rotation position θm1 is input from a rotation position detection sensor 43 that detects the rotation position of the rotor of the motor MG1. The rotation position θm2 is input from a rotation position detection sensor 44 that detects the rotation position of the rotor of the motor MG2. The phase currents are input from current sensors that respectively detect currents respectively flowing through the phases of each of the motors MG1, MG2. The temperature tm1 is input from a temperature sensor 45 that detects the temperature of the motor MG1. The temperature tm2 is input from a temperature sensor 46 that detects the temperature of the motor MG2. The wheel speeds are input from wheel speed sensors respectively attached to the drive wheels 39a, 39b.

Switching control signals, and the like, are output from the motor ECU 40 to switching elements (not shown) of the inverters 41, 42.

The motor ECU 40 is connected to the HV-ECU 70 via the communication port. The motor ECU 40 executes drive control over the motors MG1, MG2 in response to a control signal from the HV-ECU 70, and, where necessary, outputs data regarding the driving states of the motors MG1, MG2 to the HV-ECU 70. The motor ECU 40 computes the angular velocity ωm1 and rotation speed Nm1 of the motor MG1 on the basis of the rotation position θm1 of the rotor of the motor MG1 from the rotation position detection sensor 43, and computes the angular velocity ωm2 and rotation speed Nm2 of the motor MG2 on the basis of the rotation position θm2 of the rotor of the motor MG2 from the rotation position detection sensor 44. The motor ECU 40 computes a drive wheel angular velocity ωdw as a value obtained by converting the angular velocity of each of the drive wheels 39a, 39b to an angular velocity based on the rotary shaft of the motor MG2 on the basis of the wheel speeds of the drive wheels 39a, 39b from the wheel speed sensors.

The battery 50 is, for example, a lithium ion secondary battery or a nickel-metal hydride secondary battery, and is connected to the power lines 54. The battery 50 is managed by a battery electronic control unit (hereinafter, referred to as battery ECU) 52.

Although not shown in the drawing, the battery ECU 52 is a microprocessor that mainly includes a CPU and that further includes a ROM, a RAM, input/output ports and a communication port in addition to the CPU. The ROM stores a processing program. The RAM temporarily stores data.

Signals from various sensors, which are required to manage the battery 50, are input to the battery ECU 52 via the input port. The signals that are input to the battery ECU 52 include a battery voltage Vb, a battery current Ib (the battery current Ib is a positive value when the battery 50 is discharged), and a battery temperature Tb. The battery voltage Vb is output from a voltage sensor 51a installed between the terminals of the battery 50. The battery current Ib is output from a current sensor 51b connected to the output terminal of the battery 50. The battery temperature Tb is output from a temperature sensor 51c connected to the battery 50.

The battery ECU 52 is connected to the HV-ECU 70 via the communication port, and, where necessary, outputs data regarding the state of the battery 50 to the HV-ECU 70. The battery ECU 52 computes a state of charge SOC on the basis of an accumulated value of the battery current Ib from the current sensor 51b. The state of charge SOC is the percentage of the capacity of dischargeable electric power from the battery 50 to the total capacity of the battery 50.

The charger 60 is connected to the power lines 54. When a power supply plug 61 is connected to an external power supply, such as a domestic power supply, the charger 60 is configured to be able to charge the battery 50 with electric power from the external power supply. The charger 60 includes an AC/DC converter and a DC/DC converter. The AC/DC converter converts alternating-current power, supplied from the external power supply via the power supply plug 61, to direct-current power. The DC/DC converter converts the voltage of direct-current power from the AC/DC converter and supplies the direct-current power toward the battery 50. When the power supply plug 61 is connected to the external power supply, the charger 60 supplies electric power from the external power supply to the battery 50 under control of the HV-ECU 70 over the AC/DC converter and the DC/DC converter.

The hydraulic brake device 90 includes brake wheel cylinders 96a, 96b, 96c, 96d and a brake actuator 94. The brake wheel cylinders 96a, 96b, 96c, 96d are respectively connected to the drive wheels 39a, 39b and driven wheels. The brake actuator 94 is configured as an actuator for applying braking force to the drive wheels 39a, 39b and the driven wheels. The brake actuator 94 adjusts the hydraulic pressures of the brake wheel cylinders 96a, 96b, 96c, 96d such that a braking force corresponding to the share of the hydraulic brake device 90 acts on the drive wheels 39a, 39b and the driven wheels within a braking force that is exerted on the vehicle and determined on the basis of and the vehicle speed V and the pressure (brake pressure) of a master cylinder 92, which is generated in response to depression of the brake pedal 85. The brake actuator 94 adjusts the hydraulic pressures of the brake wheel cylinders 96a, 96b, 96c, 96d such that braking force acts on the drive wheels 39a, 39b and the driven wheels irrespective of depression of the brake pedal 85. Hereinafter, braking force that is exerted on the drive wheels 39a, 39b and the driven wheels as a result of operation of the brake actuator 94 is referred to as hydraulic brake. The brake actuator 94 undergoes drive control of a brake electronic control unit (hereinafter, referred to as brake ECU) 98.

Although not shown in the drawing, the brake ECU 98 is a microprocessor that mainly includes a CPU and that further includes a ROM, a RAM, input/output ports and a communication port in addition to the CPU. The ROM stores a processing program. The RAM temporarily stores data. Signals from various sensors, which are required to execute drive control over the brake actuator 94, are input to the brake ECU 98. The signals that are input to the brake ECU 98 include a master cylinder pressure (brake depression force Fb) and wheel speeds. The master cylinder pressure (brake depression force Fb) is input from a pressure sensor (not shown) attached to the master cylinder 92. The wheel speeds are input from the wheel speed sensors respectively attached to the drive wheels 39a, 39b and the driven wheels.

A drive control signal to the brake actuator 94, or the like, is output from the brake ECU 98 via the output port.

The brake ECU 98 is connected to the HV-ECU 70 via the communication port. The brake ECU 98 executes drive control over the brake actuator 94 in response to a control signal from the HV-ECU 70, and, where necessary, outputs data regarding the state of the brake actuator 94 to the HV-ECU 70.

Although not shown in the drawing, the HV-ECU 70 is a microprocessor that mainly includes a CPU and that further includes a ROM, a RAM, input/output ports and a communication port in addition to the CPU. The ROM stores a processing program. The RAM temporarily stores data.

Signals from various sensors are input to the HV-ECU 70 via the input port. The signals that are input to the HV-ECU 70 include an ignition signal, a shift position SP, an accelerator operation amount Acc, a brake pedal position BP and a vehicle speed V. The ignition signal is output from an ignition switch 80. The shift position SP is output from a shift position sensor 82 that detects the operating position of a shift lever 81. The accelerator operation amount Acc is output from an accelerator pedal position sensor 84 that detects the depression amount of an accelerator pedal 83. The brake pedal position BP is output from a brake pedal position sensor 86 that detects the depression amount of a brake pedal 85. The vehicle speed V is output from a vehicle speed sensor 88.

As described above, the HV-ECU 70 is connected to the engine ECU 24, the motor ECU 40, the battery ECU 52 and the brake ECU 98 via the communication port, and exchanges various control signals and data with the engine ECU 24, the motor ECU 40, the battery ECU 52 and the brake ECU 98.

The thus configured hybrid vehicle 20 according to the embodiment travels in HV drive mode (hybrid drive mode) or EV drive mode (electric drive mode) in charge depleting (CD) mode or charge sustaining (CS) mode. The CD mode is a mode in which the EV drive mode is given a higher priority between the HV drive mode and the EV drive mode than the CS mode. In the HV drive mode, the hybrid vehicle 20 travels while the carrier 34 is set to a rotating state to cause the engine 22 to operate. In the EV drive mode, the hybrid vehicle 20 travels while the carrier 34 is set to a rotation stopped state to cause the engine 22 not to operate. The EV drive mode includes a single-drive mode and a double-drive mode. In the single-drive mode, the hybrid vehicle 20 travels by using output (torque, power) from only the motor MG2. In the double-drive mode, the hybrid vehicle 20 travels by using output from the motor MG1 and the motor MG2.

In the hybrid vehicle 20 according to the embodiment, when the power supply plug 61 is connected to an external power supply during an off state of the system at home or a charging point set in advance, the HV-ECU 70 controls the charger 60 such that the battery 50 is charged with electric power from the external power supply. At startup of the system, when the state of charge SOC of the battery 50 is higher than or equal to a threshold Shv1 (for example, 45%, 50%, 55%, or the like), the hybrid vehicle 20 travels in the CD mode until the state of charge SOC of the battery 50 becomes lower than or equal to a threshold Shv2 (for example, 25%, 30%, 35%, or the like), and travels in the CS mode after the state of charge SOC of the battery 50 becomes lower than or equal to the threshold Shv2. At startup of the system, when the state of charge SOC of the battery 50 is lower than the threshold Shv1, the hybrid vehicle 20 travels in the CS mode.

Next, the operation of the thus configured hybrid vehicle 20 according to the embodiment, particularly, the operation at the time when the hybrid vehicle 20 is traveling in the EV drive mode in the CD mode or the CS mode, will be described.

Figure 2:
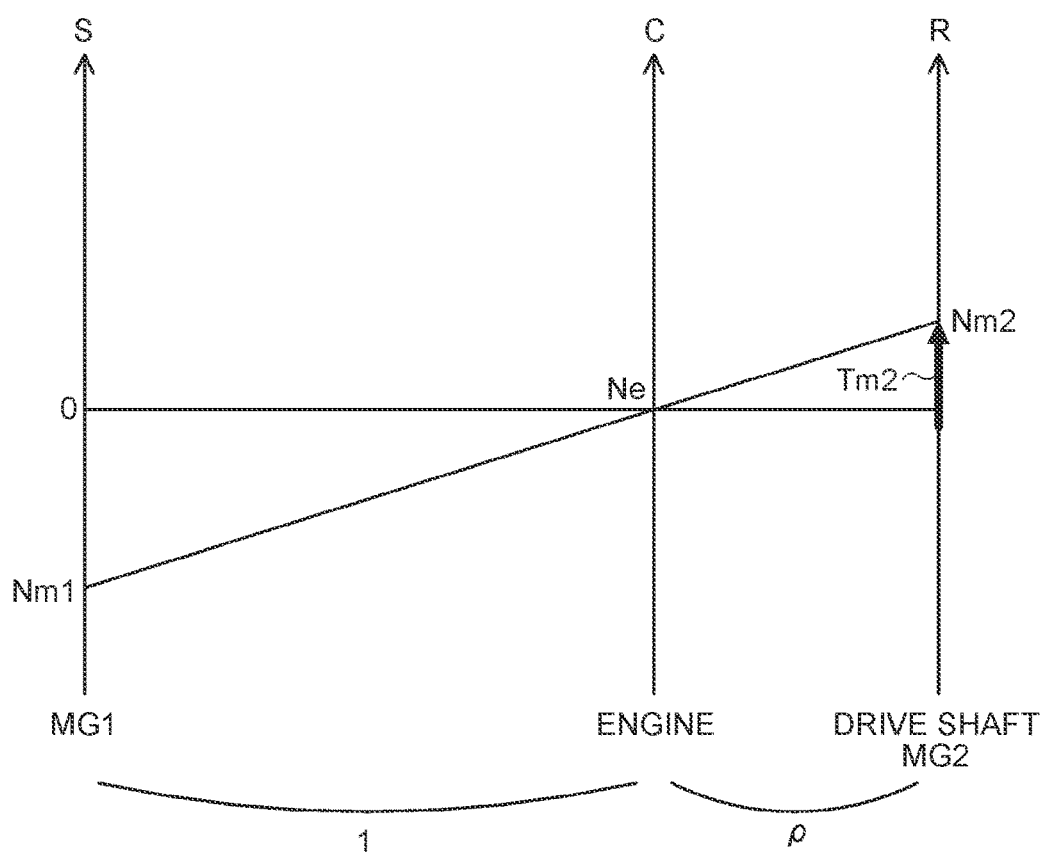
FIG. 2 is a view that illustrates an example of a nomograph of a planetary gear at the time when the hybrid vehicle travels in EV single-drive mode in the first embodiment.
Figure 3:
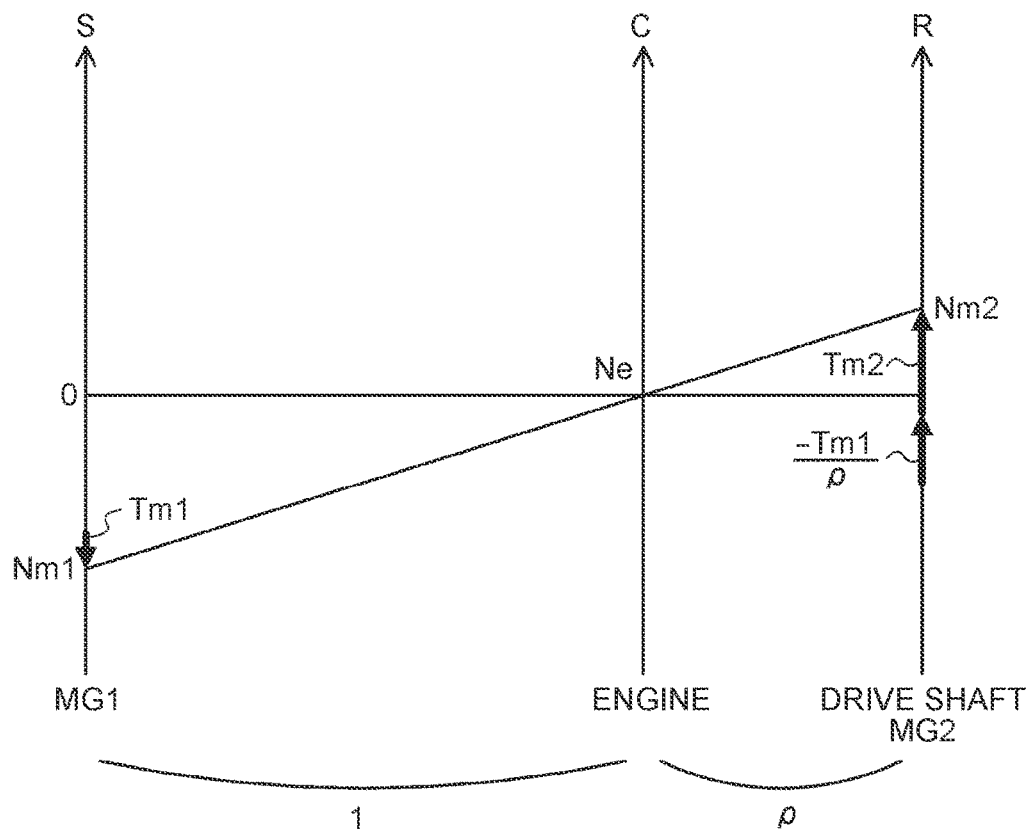
FIG. 3 is a view that illustrates an example of a nomograph of the planetary gear at the time when the hybrid vehicle travels in EV double-drive mode in the first embodiment.

FIG. 2 is a view that illustrates an example of a nomograph of the planetary gear 30 at the time when the hybrid vehicle 20 travels in the EV single-drive mode. FIG. 3 is a view that illustrates an example of a nomograph of the planetary gear 30 at the time when the hybrid vehicle 20 travels in the EV double-drive mode. In FIG. 2 and FIG. 3, the left S-axis represents the rotation speed of the sun gear 31, that is, the rotation speed Nm1 of the motor MG1, the C-axis represents the rotation speed of the carrier 34, that is, the rotation speed Ne of the engine 22, and the R-axis represents the rotation speed Nr of the ring gear 32 (drive shaft 36), that is, the rotation speed Nm2 of the motor MG2. In FIG. 3, the two wide-line arrows on the R-axis respectively indicate a torque $((-Tm1/\rho))$ that is output to the ring gear 32 (drive shaft 36) via the planetary gear 30 at the time when a torque Tm1 is output from the motor MG1 and a torque Tm2 that is output to the ring gear 32 at the time when the torque Tm2 is output from the motor MG2.

As shown in FIG. 2, in the EV single-drive mode, the torque Tm2 in the direction in which the rotation speed Nm2 of the motor MG2 is increased toward a positive side (upward direction in FIG. 2) is output from the motor MG2 to the ring gear 32 (drive shaft 36). Thus, the hybrid vehicle 20 is able to travel by using torque from the motor MG2 while the carrier 34 (engine 22) is placed in a rotation stopped state.

As shown in FIG. 3, in the EV double-drive mode, the torque Tm1 in the direction in which the rotation speed Nm1 of the motor MG1 is increased toward a negative side (downward direction in the graph) is output from the motor MG1 to the sun gear 31, and the torque Tm2 in the direction in which the rotation speed Nm2 of the motor MG2 is increased toward a positive side (upward direction in the graph) is output from the motor MG2 to the ring gear 32 (drive shaft 36). Thus, the hybrid vehicle 20 is able to travel by using torque from the motor MG1 and the motor MG2 while the carrier 34 (engine 22) is placed in a rotation stopped state. In the double-drive mode, it is possible to output larger torque (power) to the drive shaft 36 as compared to the single-drive mode. In the HV drive mode, the engine 22 is operated, so it is possible to output larger torque (power) to the drive shaft 36 as compared to the single-drive mode or the double-drive mode.

Figure 4:
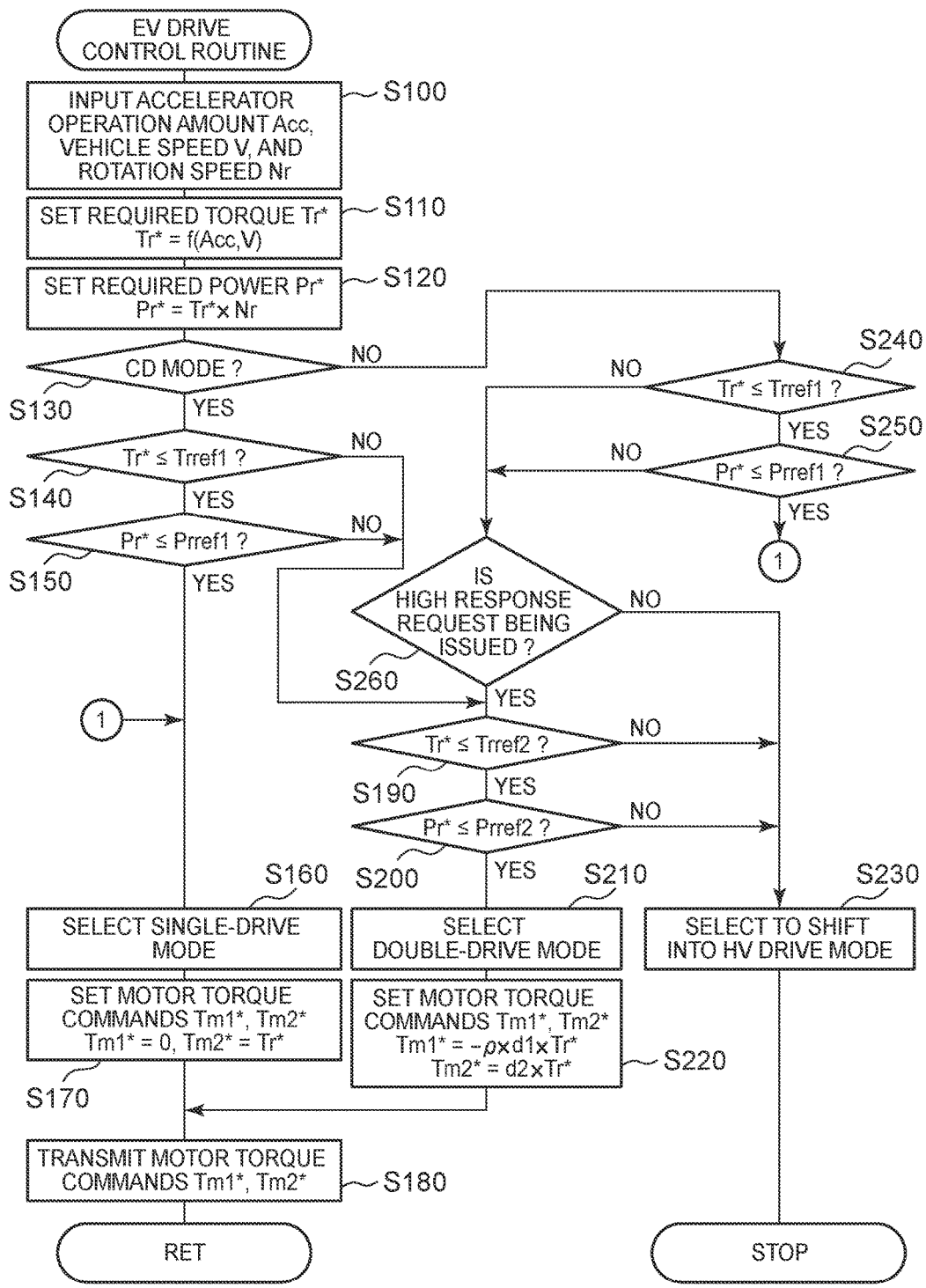
FIG. 4 is a flowchart that shows an example of an EV drive control routine that is executed by a hybrid electronic control unit according to the first embodiment.

FIG. 4 is a flowchart that shows an example of an EV drive control routine that is executed by the HV-ECU 70 according to the embodiment. This routine is repeatedly executed at the time when the hybrid vehicle 20 is traveling in the EV drive mode in the CD mode or the CS mode.

As the EV drive control routine shown in FIG. 4 is executed, the HV-ECU 70 initially inputs data, such as the accelerator operation amount Acc, the vehicle speed V and the rotation speed Nr of the drive shaft 36 (step S100). The accelerator operation amount Acc to be input is a value detected by the accelerator pedal position sensor 84. The vehicle speed V to be input is a value detected by the vehicle speed sensor 88. The rotation speed Nm2 of the motor MG2, computed by the motor ECU 40, is input via communication and is used as the rotation speed Nr of the drive shaft 36.

As the data are input in this way, a required torque Tr* that is required from the drive shaft 36 is set on the basis of the input accelerator operation amount Acc and the input vehicle speed V (step S110), and a value obtained by multiplying the set required torque Tr* by the rotation speed Nr of the drive shaft 36 is set for a required power Pr* that is required from the drive shaft 36 (step S120).

Subsequently, it is determined whether the hybrid vehicle 20 is set in the CD mode or the CS mode (step S130). Hereinafter, the operation in the CD mode and the operation in the CS mode will be described in this order.

When it is determined in step S130 that the hybrid vehicle 20 is set in the CD mode, the required torque Tr* is compared with a threshold Trref1 (step S140), and the required power Pr* is compared with a threshold Prref1 (step S150). Each of the threshold Trref1 and the threshold Prref1 is a threshold that is used to determine whether to select the EV single-drive mode.

In the embodiment, the threshold Trref1 is set to a maximum single-drive torque Trmax1 that is outputtable to the drive shaft 36 in the EV single-drive mode or a torque slightly smaller than the maximum single-drive torque Trmax1. The threshold Trref1 may be set to, for example, 450 Nm, 500 Nm, 550 Nm, or the like.

In the embodiment, the threshold Prref1 is set to a maximum single-drive power Prmax1 that is outputtable to the drive shaft 36 in the EV single-drive mode or a power slightly smaller than the maximum single-drive power Prmax1. The threshold Prref1 may be set to, for example, 20 kW, 25 kW, 30 kW, or the like.

In the embodiment, since the rotary shaft of the motor MG2 is directly coupled to the drive shaft 36 (see FIG. 1), the maximum single-drive torque Trmax1 is equal to the maximum torque Tm2max of the motor MG2. The maximum single-drive power Prmax1 is equal to the maximum power Pm2max of the motor MG2.

When the required torque Tr* is smaller than or equal to the threshold Trref1 in step S140 and the required power Pr* is smaller than or equal to the threshold Prref1 in step S150, the EV single-drive mode is selected (step S160). Then, a value of 0 is set for the torque command Tm1* of the motor MG1 and the required torque Tr* is set for the torque command Tm2* of the motor MG2 (step S170), and the set torque commands Tm1*, Tm2* are transmitted to the motor ECU 40 (step S180), after which the routine is ended. As the motor ECU 40 receives the torque commands Tm1*, Tm2* of the motors MG1, MG2, the motor ECU 40 executes switching control over the switching elements of the inverters 41, 42 such that the motor MG1 is driven at the torque command Tm1* and the motor MG2 is driven at the torque command Tm2*. In this way, the hybrid vehicle 20 is able to travel in the EV single-drive mode.

When the required torque Tr* is larger than the threshold Trref1 in step S140 or when the required power Pr* is larger than the threshold Prref1 in step S150, it is determined not to travel in the EV single-drive mode, and then the required torque Tr* is compared with a threshold Trref2 larger than the threshold Trref1 (step S190), and the required power Pr* is compared with a threshold Prref2 larger than the threshold Prref1 (step S200). Each of the threshold Trref2 and the threshold Prref2 is a threshold that is used to determine whether to select the EV double-drive mode when the EV single-drive mode is not selected.

In the embodiment, the threshold Trref2 is set to a maximum double-drive torque Trmax2 that is outputtable to the drive shaft 36 in the EV double-drive mode or a torque slightly smaller than the maximum double-drive torque Trmax2. The threshold Trref2 may be set to, for example, 650 Nm, 700 Nm, 750 Nm, or the like.

In the embodiment, the threshold Prref2 is set to a maximum double-drive power Prmax2 that is outputtable to the drive shaft 36 in the EV double-drive mode or a power slightly smaller than the maximum double-drive power Prmax2. The threshold Prref2 may be set to, for example, 65 kW, 70 kW, 75 kW, or the like.

In the embodiment, the maximum double-drive torque Trmax2 is equal to the sum of the maximum torque Tm2max of the motor MG2 and a value obtained by multiplying the minimum torque Tm1min of the motor MG1 by the gear ratio ρ of the planetary gear 30 and a value (−1). This can be easily derived from the nomograph of FIG. 3. The maximum double-drive power Prmax2 is equal to the sum of the maximum power Pm1max of the motor MG1 and the maximum power Pm2max of the motor MG2.

When the required torque Tr* is smaller than or equal to the threshold Trref2 in step S190 and the required power Pr* is smaller than or equal to the threshold Prref2 in step S200, the EV double-drive mode is selected (step S210). Subsequently, as expressed by the following mathematical expression (1), a value obtained by multiplying the required torque Tr* by the distribution rate d1, the gear ratio ρ of the planetary gear 30 and a value (−1) is set for the torque command Tm1* of the motor MG1, and, as expressed by the mathematical expression (2), a value obtained by multiplying the required torque Tr* by the distribution rate d2 is set for the torque command Tm2* of the motor MG2 (step S220). The set torque commands Tm1*, Tm2* are transmitted to the motor ECU 40 (step S180), after which the routine is ended.

$$Tm1^* = -\rho \times d1 \times Tr^* \quad (1)$$

$$Tm2^* = d2 \times Tr^* \quad (2)$$

The distribution rate d1 is the rate of a torque (hereinafter, referred to as first distribution torque) that is output from the motor MG1 to the drive shaft 36 via the planetary gear 30 within the required torque Tr, the distribution rate d2 is the rate of a torque (hereinafter, referred to as second distribution torque) that is output from the motor MG2 to the drive shaft 36 within the required torque Tr, and the sum of the distribution rate d1 and the distribution rate d2 is 1. Since the operation in the double-drive mode is being considered, each of the distribution rates d1, d2 is larger than 0 and smaller than 1. In the embodiment, the torque commands Tm1*, Tm2* of the motors MG1, MG2 are set such that the efficiency of the vehicle as a whole increases or an output (torque, power) from the motor MG2 becomes relatively large within the range in which the maximum torque Tm1max and minimum torque Tm1min of the motor MG1, the maximum torque Tm2max and minimum torque Tm2min of the motor MG2, the maximum power Pm1max and minimum power Pm1min of the motor MG1, and the maximum power Pm2max and minimum power Pm2min of the motor MG2 satisfy all the following mathematical expressions (3) to (6).

$$Tm1\min \leq Tm1^* \leq Tm1\max \quad (3)$$

$$Pm1\min \leq Tm1^* \times Nm1 \leq Pm1\max \quad (4)$$

$$Tm2\min \leq Tm2^* \leq Tm2\max \quad (5)$$

$$Pm2\min \leq Tm2^* \times Nm2 \leq Pm2\max \quad (6)$$

In this way, the hybrid vehicle 20 is able to travel in the EV double-drive mode. Therefore, when the required torque Tr* becomes larger than the threshold Trref1 or the required power Pr* becomes larger than the threshold Prref1 in the CD mode in the EV single-drive mode (when the required torque Tr* is smaller than or equal to the threshold Trref2 and the required power Pr* is smaller than or equal to the threshold Prref2), the hybrid vehicle 20 travels in the double-drive mode without causing the drive mode to shift into the HV drive mode by starting the engine 22. Thus, it is possible to give a higher priority to the EV drive mode, and it is possible to obtain higher response as compared to control that starts the engine 22.

When the required torque Tr* is larger than the threshold Trref2 in step S190 or when the required power Pr* is larger than the threshold Prref2 in step S200, the HV-ECU 70 selects to shift into the HV drive mode (step S230), after which the routine is ended. In this case, the HV-ECU 70 shifts into the HV drive mode by starting the engine 22.

The engine 22 is started through coordinated control of the HV-ECU 70, the engine ECU 24 and the motor ECU 40 by cranking the engine 22 with the use of the motor MG1 and starting operation control over the engine 22 (fuel injection control, ignition control, and the like) at the time when the rotation speed Ne of the engine 22 becomes higher than or equal to a predetermined rotation speed (for example, 800 rpm, 900 rpm, 1000 rpm, or the like).

When the hybrid vehicle 20 is traveling in the HV drive mode in the CD mode, the HV-ECU 70 sets the required torque Tr* and the required power Pr* as in the case of the EV drive control routine shown in FIG. 4, and sets the required power Pe* of the engine 22 by subtracting a required charging and discharging power Pb* of the battery 50 from the set required power Pr*. In the embodiment, when the hybrid vehicle 20 is traveling in the HV drive mode in the CD mode, a value of 0 is set for the required charging and discharging power Pb* of the battery 50. A target rotation speed Ne* and target torque Te of the engine 22 and the torque commands Tm1*, Tm2* of the motors MG1, MG2 are set such that the required power Pe* is output from the engine 22 and the required torque Tr* is output to the drive shaft 36 within the range of the maximum torque Tm1max and minimum torque Tm1min of the motor MG1, the maximum torque Tm2max and minimum torque Tm2min of the motor MG2, the maximum power Pm1max and minimum power Pm1min of the motor MG1 and the maximum power Pm2max and minimum power Pm2min of the motor MG2. The target rotation speed Ne* and target torque Te* of the engine 22 are transmitted to the engine ECU 24, and the torque commands Tm1*, Tm2* of the motors MG1, MG2 are transmitted to the motor ECU 40. As the engine ECU 24 receives the target rotation speed Ne* and target torque Te* of the engine 22, the engine ECU 24 executes intake air amount control, fuel injection control, ignition control, and the like, over the engine 22 such that the engine 22 is operated on the basis of the received target rotation speed Ne* and target torque Te*. Thus, it is possible to output larger torque (power) to the drive shaft 36 as compared to the EV single-drive mode or the EV double-drive mode. As a result, it is possible to further reliably output the required torque Tr* (required power Pr*) commensurate with the accelerator operation amount Acc to the drive shaft 36. In the embodiment, when the required torque Tr* becomes smaller than or equal to the threshold Trref2 and the required power Pr* becomes smaller than or equal to the threshold Prref2 in the HV drive mode in the CD mode, the HV-ECU 70 stops the engine 22 and shifts into the EV drive mode (resumes execution of the EV drive control routine shown in FIG. 4).

Next, the operation in the CS mode will be described. When it is determined in step S130 that the hybrid vehicle 20 is set in the CS mode, the required torque Tr* is compared with the threshold Trref1 (step S240), and the required power Pr* is compared with the threshold Prref1 (step S250), as in the case of the processes of step S140 and step S150. When the required torque Tr* is smaller than or equal to the threshold Trref1 in step S240 and the required power Pr* is smaller than or equal to the threshold Prref1 in step S250, the EV single-drive mode is selected in the above-described step S160, the torque commands Tm1*, Tm2* of the motors MG1, MG2 are set in the above-described step S170, and the torque commands Tm1*, Tm2* of the motors MG1, MG2 are transmitted to the motor ECU 40 in the above-described step S180, after which the routine is ended.

When the required torque Tr* is larger than the threshold Trref1 in step S240 or when the required power Pr* is larger than the threshold Prref1 in step S250, it is determined whether a predetermined high response request is being issued (step S260). In the embodiment, when at least one of the following conditions (a1) to (a3) is satisfied, it is determined that the predetermined high response request is being issued; whereas, when all the conditions (a1) to (a3) are not satisfied, it is determined that the predetermined high response request is not being issued.

(a1) A rate of increase Racc that is an increase in the accelerator operation amount Acc per unit time is larger than or equal to a threshold Raccref.

(a2) An increase ΔAcc in the depression amount of the accelerator pedal 83 is larger than or equal to a threshold ΔAccref.

(a3) The accelerator operation amount Acc is larger than or equal to a threshold Accref.

In (a1), an increase in the accelerator operation amount Acc in a predetermined time (for example, about several milliseconds to several hundreds of milliseconds) is converted to an increase per unit time (for example, 1 millisecond, or the like), and is used as the rate of increase Racc. The threshold Raccref may be set to, for example, 0.0001%/msec, 0.0005%/msec, 0.001%/msec, or the like. In (a2), an increase in the current accelerator operation amount Acc with respect to the accelerator operation amount Acc during cruising (when the vehicle speed V is substantially constant) is used as the increase ΔAcc in the depression amount. The threshold ΔAccref may be set to, for example, 10%, 12%, 15%, or the like. In (a3), the threshold Accref may be set to, for example, 60%, 65%, 70%, or the like.

In determining whether the predetermined high response request is being issued, only part of the conditions (a1) to (a3) may be used.

When it is determined in step S260 that the predetermined high response request is not being issued, the HV-ECU 70 selects to shift into the HV drive mode (step S230), after which the routine is ended. A start of the engine 22 is described above. Control at the time when the hybrid vehicle 20 is traveling in the HV drive mode in the CS mode is basically the same as control at the time when the hybrid vehicle 20 is traveling in the HV drive mode in the CD mode. However, at this time, a value of 0 is set for the required charging and discharging power Pb* of the battery 50 when the state of charge SOC of the battery 50 is a target state of charge SOC* (for example, the state of charge SOC at the start of the CS mode), a negative value (charging value) is set for the required charging and discharging power Pb* when the state of charge SOC is lower than the target state of charge SOC*, and a positive value (discharging value) is set for the required charging and discharging power Pb* when the state of charge SOC is higher than the threshold SOC*. In the embodiment, when the hybrid vehicle 20 is traveling in the HV drive mode in the CS mode, irrespective of whether the predetermined high response request is being issued, when the required torque Tr* becomes smaller than or equal to the threshold Trref1 and the required power Pr* becomes smaller than or equal to the threshold Prref1, the HV-ECU 70 stops the engine 22 and shifts into the EV drive mode (resumes execution of the EV drive control routine shown in FIG. 4).

The state of charge SOC of the battery 50 in the CS mode is often lower than that in the CD mode. In the embodiment, in light of this, when the predetermined high response request is not being issued at the time when the required torque Tr* is larger than the threshold Trref1 or the required power Pr* is larger than the threshold Prref1 in the EV drive mode in the CS mode, the HV-ECU 70 shifts into the HV drive mode. Thus, it is possible to reduce a decrease in the state of charge SOC of the battery 50. At the time when the HV-ECU 70 shifts into the HV drive mode, the engine 22 is started, so it takes a certain time to start the HV drive mode (start to output power from the engine 22).

When it is determined in step S260 that the predetermined high response request is being issued, the required torque Tr* is compared with the threshold Trref2 in step S190, and the required power Pr* is compared with the threshold Prref2 in step S200. When the required torque Tr* is smaller than or equal to the threshold Trref2 and the required power Pr* is smaller than or equal to the threshold Prref2, the EV double-drive mode is selected in the above-described step S210, the torque commands Tm1*, Tm2* of the motors MG1, MG2 are set in the above-described step S220, and the torque commands Tm1*, Tm2* of the motors MG1, MG2 are transmitted to the motor ECU 40 in the above-described step S180, after which the routine is ended.

Thus, when the required torque Tr* becomes larger than the threshold Trref1 or the required power Pr* becomes larger than the threshold Prref1 in the CS mode in the EV single-drive mode (when the required torque Tr* is smaller than or equal to the threshold Trref2 and the required power Pr* is smaller than or equal to the threshold Prref2), and when the predetermined high response request is being issued, it is possible to further increase response as compared to the case where the HV-ECU 70 shifts into the HV drive mode by starting the engine 22. That is, it is possible to further meet the high response request.

When the required torque Tr* is larger than the threshold Trref2 in step S190 or when the required power Pr* is larger than the threshold Prref2 in step S200, the HV-ECU 70 selects to shift into the HV drive mode in the above-described step S230, after which the routine is ended. Thus, it is possible to output larger torque (power) to the drive shaft 36 as compared to the EV single-drive mode or the EV double-drive mode. As a result, it is possible to further reliably output the required torque Tr* (required power Pr*) commensurate with the accelerator operation amount Acc to the drive shaft 36.

Figure 5:
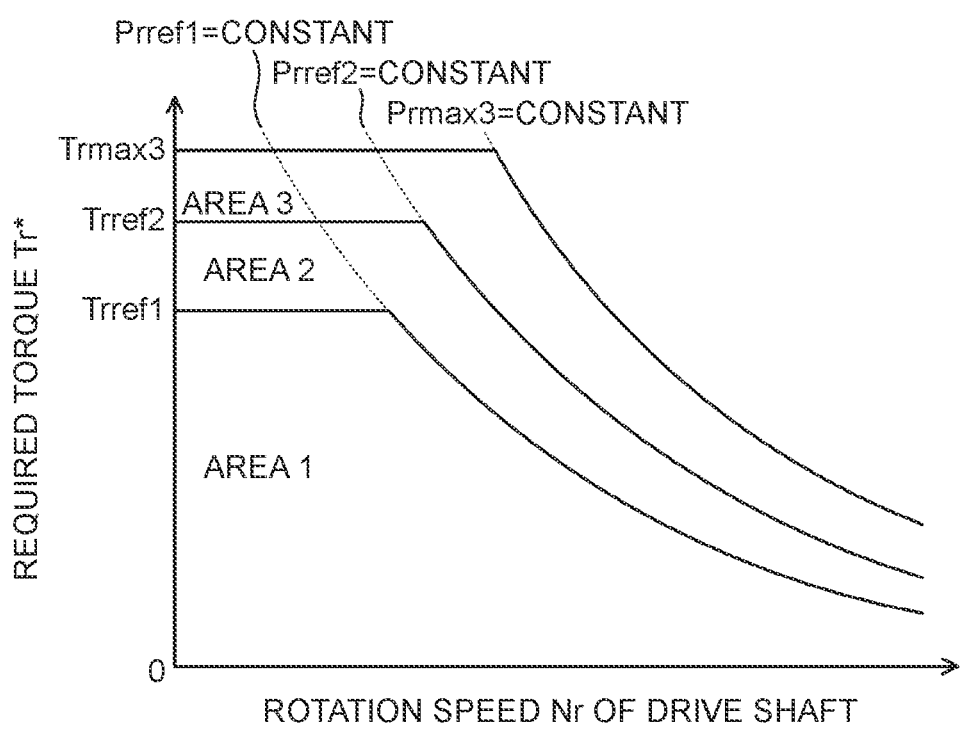
FIG. 5 is a view that illustrates an example of the relationship among a rotation speed of a drive shaft of the hybrid vehicle, a required torque and each area according to the first embodiment.

FIG. 5 is a view that shows an example of the relationship among a rotation speed Nr of the drive shaft 36, a required torque Tr* and each area. In the drawing, area 1 indicates an area in which the required torque Tr* is smaller than or equal to the threshold Trref1 and the required power Pr* is smaller than or equal to the threshold Prref1. Area 2 indicates an area in which the required torque Tr* is smaller than or equal to the threshold Trref2 and the required power Pr* is smaller than or equal to the threshold Prref2, other than area 1. Area 3 indicates an area in an area in which the required torque Tr* is smaller than or equal to an HV maximum torque Trmax3 that is outputtable to the drive shaft 36 in the HV drive mode and the required power Pr* is smaller than or equal to an HV maximum power Prmax3 that is outputtable to the drive shaft 36 in the HV drive mode, other than area 1 or area 2. In the CD mode, the hybrid vehicle 20 travels in the EV single-drive mode in area 1, travels in the EV double-drive mode in area 2, and travels in the HV drive mode in area 3. In the CS mode, the hybrid vehicle travels in the EV single-drive mode in area 1, and travels in the HV drive mode in area 3. In the CS mode, when the predetermined high response request is not being issued at the time when the area shifts from area 1 to area 2, the hybrid vehicle 20 travels in the HV drive mode. Thus, it is possible to reduce a decrease in the state of charge SOC of the battery 50. In the CS mode, when the predetermined high response request is being issued at the time when the area shifts from area 1 to area 2, the hybrid vehicle 20 travels in the EV double-drive mode. Thus, in comparison with the case where the hybrid vehicle 20 shifts into the HV drive mode by starting the engine 22, it is possible to further increase response. That is, it is possible to further meet the high response request.

With the above-described hybrid vehicle 20 according to the embodiment, when the required torque Tr* becomes larger than the threshold Trref1 or the required power Pr* becomes larger than the threshold Prref1 in the CS mode in the EV single-drive mode, the HV-ECU 70 shifts into the HV drive mode when the predetermined high response request is not being issued, and shifts into the EV double-drive mode when the predetermined high response request is being issued. Thus, when the predetermined high response request is not being issued, it is possible to reduce a decrease in the state of charge SOC of the battery 50. When the predetermined high response request is being issued, it is possible to further increase response. That is, it is possible to further meet the high response request.

Figure 6:
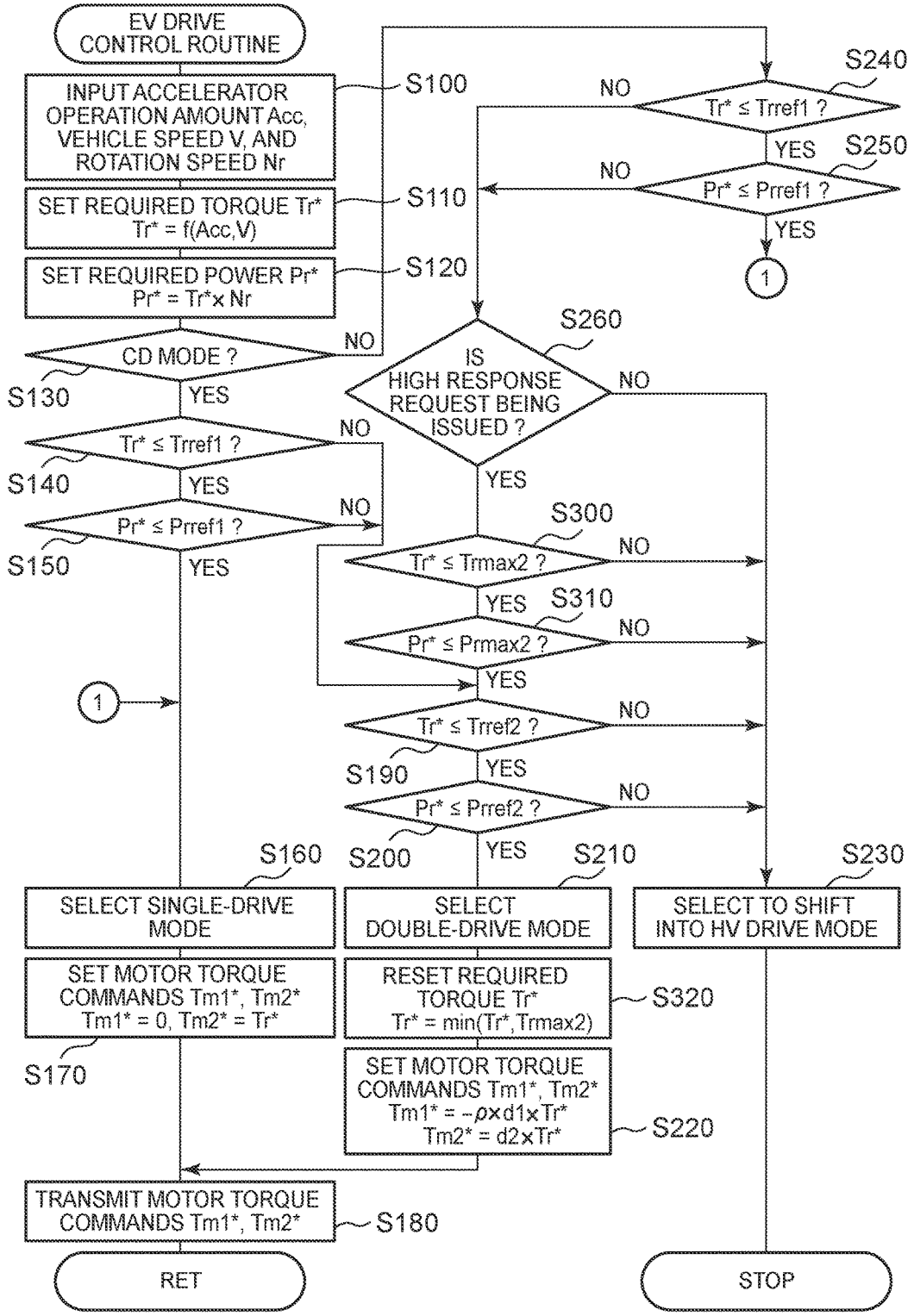
FIG. 6 is a flowchart that shows an EV drive control routine according to a first alternative embodiment to the first embodiment.

In the hybrid vehicle 20 according to the embodiment, the EV drive control routine shown in FIG. 4 is executed. Instead, an EV drive control routine shown in FIG. 6 as a first alternative embodiment to the embodiment may be executed. The EV drive control routine according to the first alternative embodiment shown in FIG. 6 is the same as the EV drive control routine shown in FIG. 4 except that the processes of step S300 to step S320 are added and the threshold Trref2 and the threshold Prref2 are changed. Therefore, like step numbers denote the same processes, and the detailed description thereof is omitted.

Initially, the threshold Trref2 and the threshold Prref2 will be described. In the EV drive control routine shown in FIG. 4, the threshold Trref2 is set to the maximum double-drive torque Trmax2 or a torque slightly smaller than the maximum double-drive torque Trmax2, and the threshold Prref2 is set to the maximum double-drive power Prmax2 or a power slightly smaller than the maximum double-drive power Prmax2. In contrast, in the EV drive control routine according to the first alternative embodiment shown in FIG. 6, the threshold Trref2 and the threshold Prref2 are set to values larger than those in the EV drive control routine shown in FIG. 4. Specifically, the threshold Trref2 is set to a value larger than the maximum double-drive torque Trmax2, and the threshold Prref2 is set to a value larger than the maximum double-drive power Prmax2.

Next, the EV drive control routine according to the first alternative embodiment to the present embodiment will be described. In the EV drive control routine shown in FIG. 6, when it is determined in step S130 that the hybrid vehicle 20 is set in the CD mode, and when the required torque Tr* is larger than the threshold Trref1 in step S140 or when the required power Pr* is larger than the threshold Prref1 in step S150, the HV-ECU 70 compares the required torque Tr* with the threshold Trref2 (step S190) and compares the required power Pr* with the threshold Prref2 (step S200). When the required torque Tr* is smaller than or equal to the threshold Trref2 and the required power Pr* is smaller than or equal to the threshold Prref2, the EV double-drive mode is selected (step S210). When the required torque Tr* is larger than the threshold Trref2 or when the required power Pr* is larger than the threshold Prref2, the HV-ECU 70 selects to shift into the HV drive mode (step S230).

In this first alternative embodiment, as described above, the threshold Trref2 and the threshold Prref2 are set to values larger than those in the EV drive control routine shown in FIG. 4. Therefore, as compared to the EV drive control routine shown in FIG. 4, it tends to be determined that the required torque Tr* is smaller than or equal to the threshold Trref2 and the required power Pr* is smaller than or equal to the threshold Prref2, and the EV double-drive mode tends to be selected. Thus, in the CD mode, it is possible to give a higher priority to the EV drive mode.

As the EV double-drive mode is selected, the required torque Tr* is reset by limiting (upper limit guard) the required torque Tr* (required torque Tr* set in step S110) commensurate with the accelerator operation amount Acc with the maximum double-drive torque Trmax2 (step S320), the torque commands Tm1*, Tm2* of the motors MG1, MG2 are set by using the reset required torque Tr* (step S220) and are transmitted to the motor ECU 40 (step S180), after which the routine is ended.

In this first alternative embodiment, even when the required torque Tr* is larger than the maximum double-drive torque Trmax2 or when the required power Pr* is larger than the maximum double-drive power Prmax2, it can be determined that the required torque Tr* is smaller than or equal to the threshold Trref2 and the required power Pr* is smaller than or equal to the threshold Prref2, and the hybrid vehicle 20 can travel in the EV double-drive mode. For this reason, the process of step S320 is executed.

When it is determined in step S130 that the hybrid vehicle 20 is set in the CS mode, when the required torque Tr* is larger than the threshold Trref1 in step S240 or when the required power Pr* is larger than the threshold Prref1 in step S250, and when it is determined in step S260 that the predetermined high response request is being issued, the required torque Tr* is compared with the maximum double-drive torque Trmax2 (step S300), and the required power Pr* is compared with the maximum double-drive power Prmax2 (step S310). When the required torque Tr* is smaller than or equal to the maximum double-drive torque Trmax2 and the required power Pr* is smaller than or equal to the maximum double-drive power Prmax2, the process from step S190 is executed. When the required torque Tr* is larger than the maximum double-drive torque Trmax2 or when the required power Pr* is larger than the maximum double-drive power Prmax2, the HV-ECU 70 selects to shift into the HV drive mode (step S230), after which the routine is ended.

Unless the process of step S300 is provided, even when the required torque Tr* is larger than the maximum double-drive torque Trmax2 or the required power Pr* is larger than the maximum double-drive power Prmax2 at the time when the predetermined high response request is being issued in the CS mode, it can be determined that the required torque Tr* is smaller than or equal to the threshold Trref2 and the required power Pr* is smaller than or equal to the threshold Prref2. In this case, the hybrid vehicle 20 is not able to travel in the EV double-drive mode in order to output the required torque Tr* (the required torque Tr* set in step S110) commensurate with the accelerator operation amount Acc to the drive shaft 36. In contrast, with the process of step S300, when the required torque Tr* is larger than the maximum double-drive torque Trmax2 or when the required power Pr* is larger than the maximum double-drive power Prmax2 at the time when the predetermined high response request is being issued in the CS mode, the HV-ECU 70 shifts into the HV drive mode. Thus, when the required torque Tr* becomes larger than the maximum double-drive torque Trmax2 or the required power Pr* becomes larger than the maximum double-drive power Prmax2 in the CS mode, it is possible to further reliably output the required torque Tr* commensurate with the accelerator operation amount Acc to the drive shaft 36.

Figure 7:
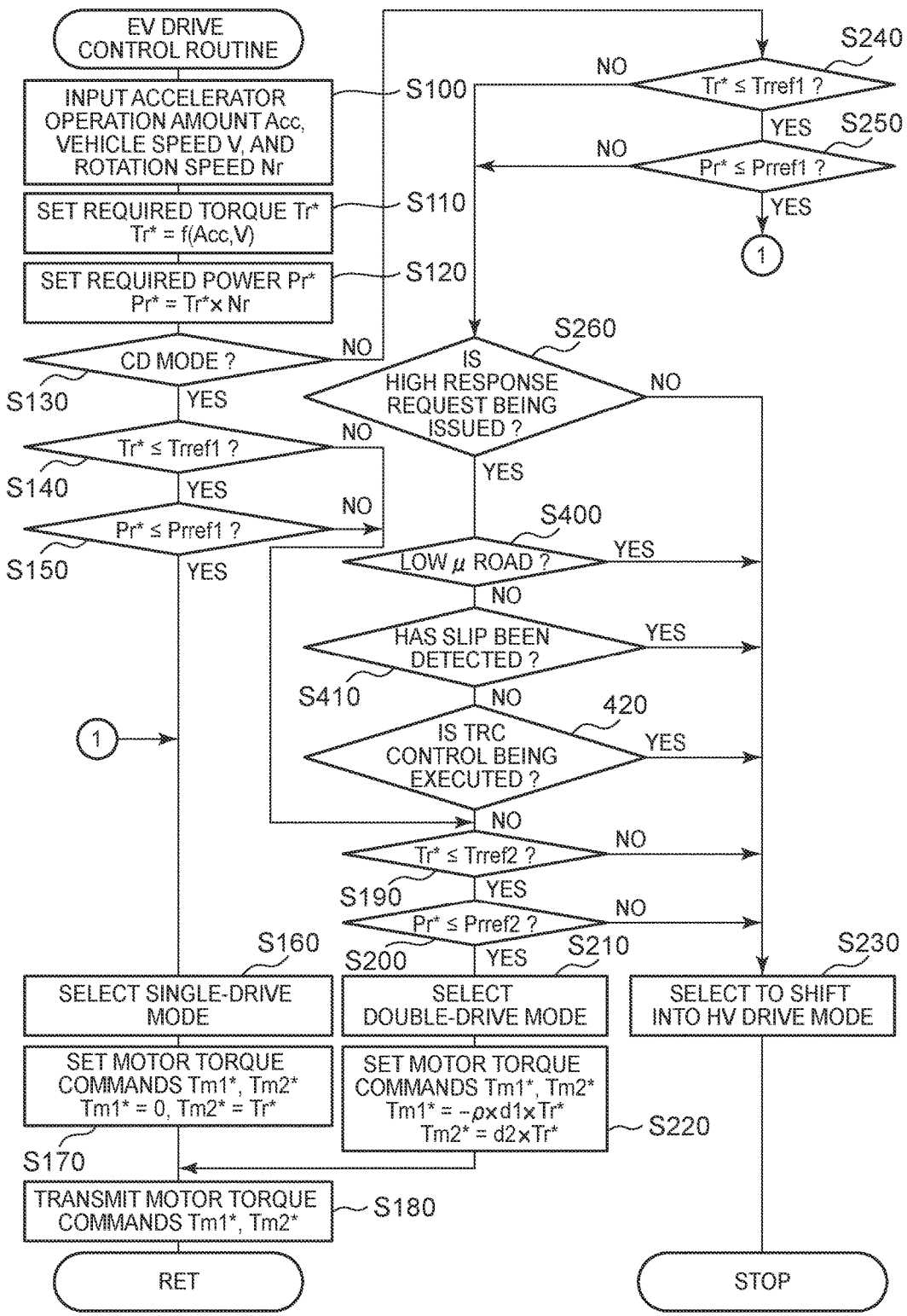
FIG. 7 is a flowchart that shows an EV drive control routine according to a second alternative embodiment to the first embodiment.

In the hybrid vehicle 20 according to the embodiment, the EV drive control routine shown in FIG. 4 is executed. Instead, an EV drive control routine shown in FIG. 7 as a second alternative embodiment to the embodiment may be executed. The EV drive control routine according to the second alternative embodiment shown in FIG. 7 is the same as the EV drive control routine shown in FIG. 4 except that the processes of step S400 to step S420 are added. Therefore, like step numbers denote the same processes, and the detailed description thereof is omitted.

In the hybrid vehicle 20, when a slip due to wheel spin of the drive wheels 39a, 39b has been detected, traction control (TRC) for reducing the extent of the slip by applying braking force caused by a hydraulic brake to the drive wheels 39a, 39b is executed. When a difference ΔVw between the wheel speed of each of the drive wheels 39a, 39b and the wheel speed of each driven wheel is smaller than or equal to a threshold ΔVwref, it is determined that there is no slip due to wheel spin of the drive wheels 39a, 39b (no slip has been detected); whereas, when the difference ΔVw is larger than the threshold ΔVwref, it is determined that there is a slip due to wheel spin of the drive wheels 39a, 39b (a slip has been detected).

In the EV drive control routine according to the second alternative embodiment shown in FIG. 7, when it is determined in step S130 that the hybrid vehicle 20 is set in the CS mode and when it is determined in step S260 that the predetermined high response request is being issued at the time when the required torque Tr* is larger than the threshold Trref1 in step S240 or when the required power Pr* is larger than the threshold Prref1 in step S250, the HV-ECU 70 determines whether the hybrid vehicle 20 is traveling on a predetermined low μ road (step S400), determines whether a slip due to wheel spin of the drive wheels 39a, 39b has been detected (step S410) and determines whether TRC control is being executed (step S420).

The predetermined low μ road is a traveling road where the friction coefficient between the drive wheels 39a, 39b and a road surface is smaller than or equal to a predetermined value (traveling road where a slip due to wheel spin of the drive wheels 39a, 39b tends to occur), and is, for example, a snowy road, an icy road, or the like. For example, when a low μ road switch by which a driver informs that the hybrid vehicle 20 is traveling on the predetermined low μ road is provided, whether the hybrid vehicle 20 is traveling on the low μ road is allowed to be determined on the basis of whether the low μ road switch is in an on state or an off state.

When the hybrid vehicle 20 is not traveling on the predetermined low μ road in step S400, when a slip due to wheel spin of the drive wheels 39a, 39b has not been detected in step S410 and when. TRC control is not being executed in step S420, the process from step S190 is executed.

When the hybrid vehicle 20 is traveling on the predetermined low μ road in step S400, when a slip due to wheel spin of the drive wheels 39a, 39b has been detected in step S410 or when TRC control is being executed in step S420, the HV-ECU 70 selects to shift into the HV drive mode (step S230), after which the routine is ended.

When the high response request is being issued at the time when the required torque Tr* becomes larger than the threshold Trref1 or the required power Pr* becomes larger than the threshold Prref1 in the CS mode, and when the HV-ECU 70 shifts from the EV single-drive mode to the EV double-drive mode as described above, it is possible to further increase response as compared to when the HV-ECU 70 shifts from the EV single-drive mode to the HV drive mode. If the HV-ECU 70 shifts from the single-drive mode to the double-drive mode at the time when the hybrid vehicle 20 is traveling on the predetermined low μ road, there is a possibility that a slip due to wheel spin of the drive wheels 39a, 39b tends to occur since the response further increases. If the HV-ECU 70 shifts from the single-drive mode to the double-drive mode at the time when a slip due to wheel spin of the drive wheels 39a, 39b has been detected or when TRC control is being executed, there is a possibility that a time required until the slip due to wheel spin of the drive wheels 39a, 39b eliminates extends. In consideration of these, in this alternative embodiment, when the high response request is being issued at the time when the required torque Tr* becomes larger than the threshold Trref1 or the required power Pr* becomes larger than the threshold Prref1 in the CS mode, and when at least one of the condition that the hybrid vehicle 20 is traveling on the predetermined low μ road, the condition that a slip due to wheel spin of the drive wheels 39*a*, 39*b* has been detected and the condition that TRC control is being executed is satisfied, the HV-ECU 70 shifts into the HV drive mode. Thus, it is possible to prevent occurrence of a slip due to wheel spin of the drive wheels 39*a*, 39*b* when the hybrid vehicle 20 is traveling on the predetermined low μ road, and it is possible to prevent extension of time to elimination of a slip when a slip due to wheel spin of the drive wheels 39*a*, 39*b* has been detected or when TRC control is being executed.

In the hybrid vehicle 20 according to the embodiment, the threshold Trref1 and the threshold Prref1 are used as the threshold for determining whether to select the EV single-drive mode. Instead, only any one of the threshold Trref1 and the threshold Prrref1 may be used. In this case, when the rotation speed Nr of the drive shaft 36 is lower than or equal to a threshold Nrref1, only the threshold Trref1 may be used; whereas, when the rotation speed Nr of the drive shaft 36 is higher than the threshold Nrref1, only the threshold Prref1 may be used. In the embodiment, the threshold Trref2 and the threshold Prref2 are used as the threshold for determining whether to select the EV double-drive mode at the time when the EV single-drive mode is not selected. Instead, only any one of the threshold Trref2 and the threshold Prref2 may be used. In this case, when the rotation speed Nr of the drive shaft 36 is lower than or equal to a threshold Nrref2, only the threshold Trref2 may be used; whereas, when the rotation speed Nr of the drive shaft 36 is higher than the threshold Nrref2, only the threshold Prref2 may be used. The required torque Tr* or the required power Pr* is an example of the required output according to the present disclosure.

Figure 8:
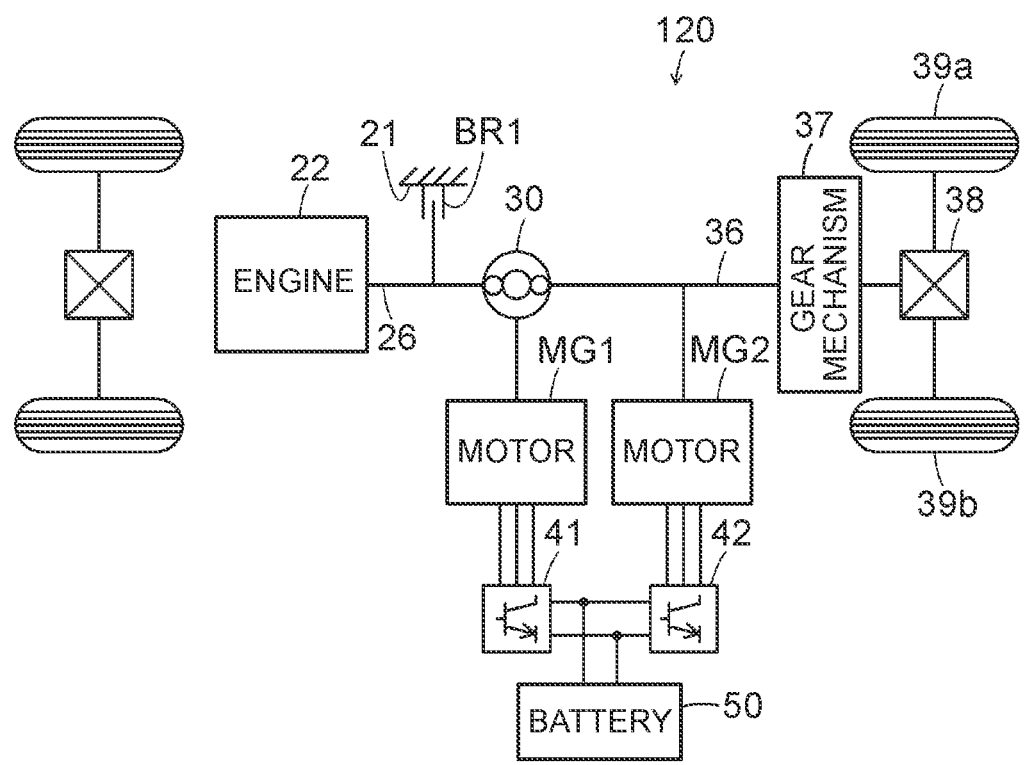
FIG. 8 is a configuration view that schematically shows the configuration of a hybrid vehicle according to a second embodiment of the present disclosure.

In the hybrid vehicle 20 according to the embodiment, the one-way clutch CL1 is connected to the crankshaft 26 of the engine 22. Instead, the one-way clutch CL1 may be replaced with those according to a second embodiment that will be described below. FIG. 8 shows a hybrid vehicle 120 according to the second embodiment. A brake BR1 is provided. The brake BR1 fixes (connects) the crankshaft 26 of the engine 22 to the case 21 such that the crankshaft 26 is non-rotatable, or releases the crankshaft 26 of the engine 22 from the case 21 such that the crankshaft 26 is rotatable. In this case, when the hybrid vehicle 120 travels in the EV drive mode, basically, the engine 22 is set to a rotation stopped state by setting the brake BR1 to an engaged state. When the hybrid vehicle 120 travels in the HV drive mode, the engine 22 is set to a rotating state by setting the brake BR1 to a released state.

The hybrid vehicle 20 according to the first embodiment includes the single planetary gear 30 as the planetary gear set. Instead, two or more planetary gears may be provided as the planetary gear set. In this case, the configuration shown as a hybrid vehicle 220 according to a third embodiment of the present disclosure shown in FIG. 9 may be employed, or the configuration shown as a hybrid vehicle 320 according to a fourth embodiment shown in FIG. 10 may be employed.

Figure 9:
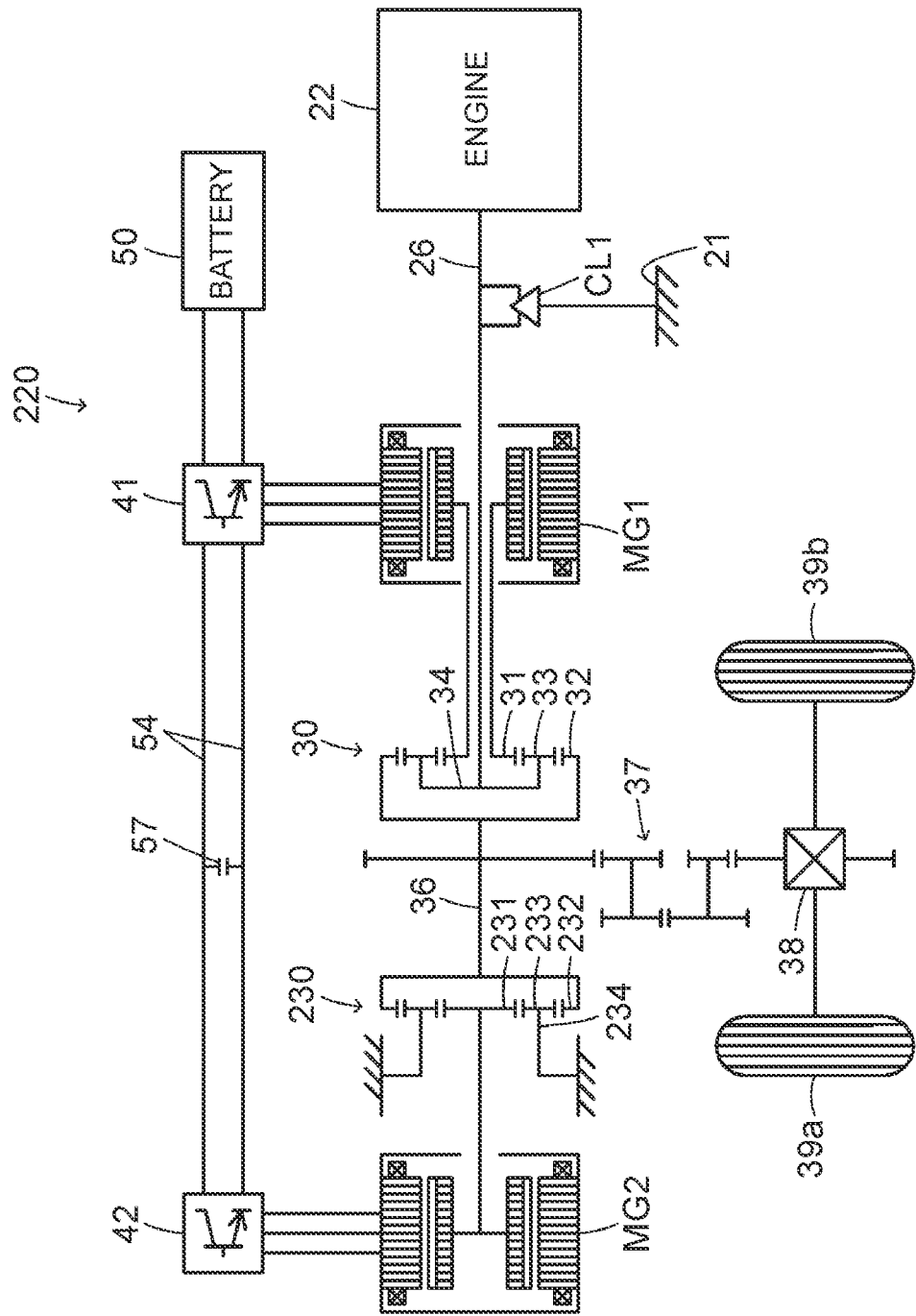
FIG. 9 is a configuration view that schematically shows the configuration of a hybrid vehicle according to a third embodiment of the present disclosure.

The hybrid vehicle 220 according to the third embodiment shown in FIG. 9 includes a planetary gear 230 in addition to the same planetary gear 30 as that of the hybrid vehicle 20 as the planetary gear set. The planetary gear 230 is a single pinion planetary gear. The planetary gear 230 includes a sun gear 231, a ring gear 232, a plurality of pinion gears 233 and a carrier 234. The sun gear 231 is an external gear. The ring gear 232 is an internal gear. The plurality of pinion gears 233 are in mesh with the sun gear 231 and the ring gear 232. The carrier 234 supports the plurality of pinion gears 233 such that each pinion gear 233 is rotatable and revolvable. The rotor of the motor MG2 is connected to the sun gear 231. The drive shaft 36 is connected to the ring gear 232. The carrier 234 is fixed to the case 21 so as to be non-rotatable. The gear ratio of the planetary gear 230 is adjusted such that the planetary gear 230 functions as a reduction gear between the motor MG2 and the drive shaft 36. The hybrid vehicle 220 is able to travel in the double-drive mode as in the case of the first embodiment.

Figure 10:
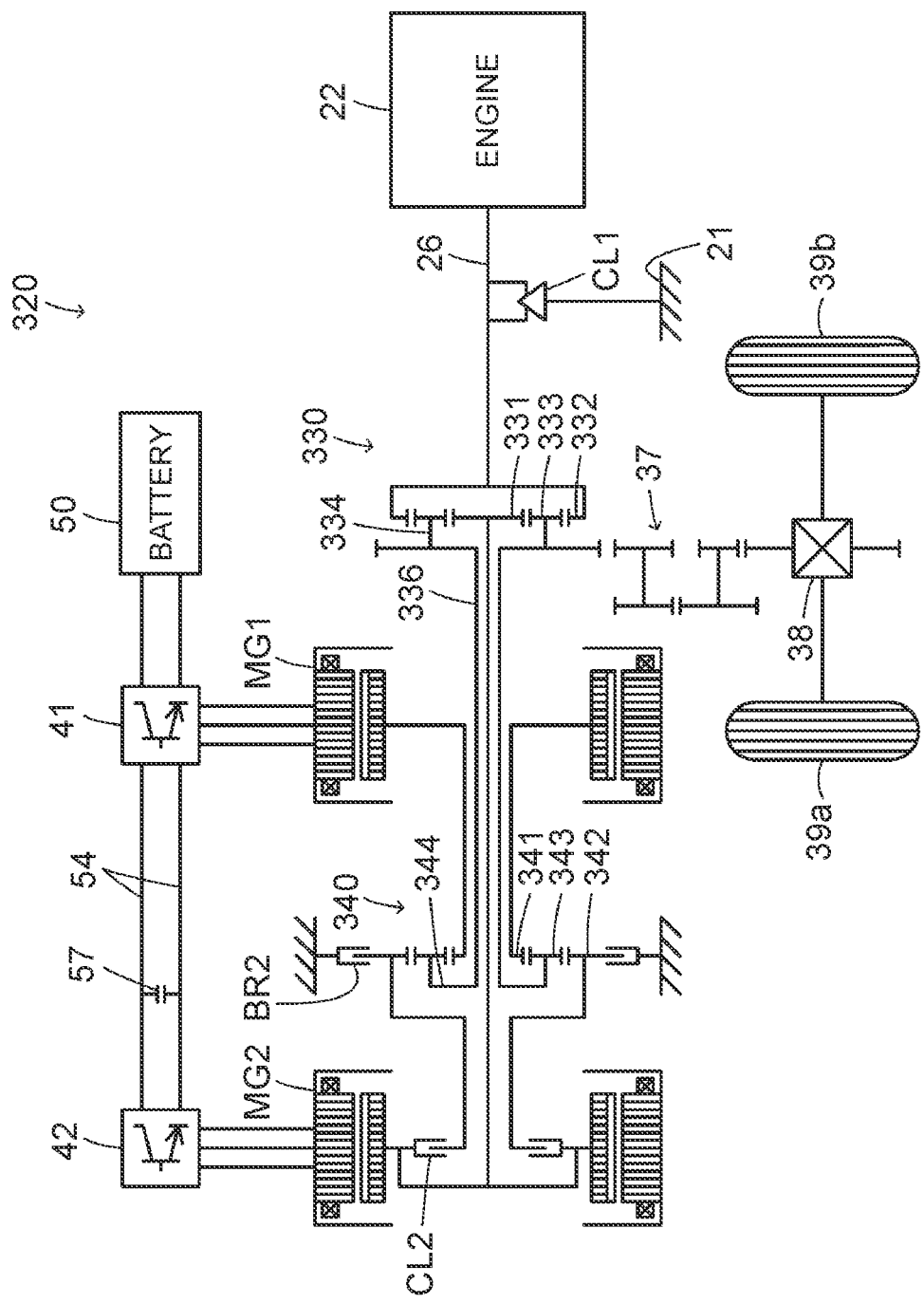
FIG. 10 is a configuration view that schematically shows the configuration of a hybrid vehicle according to a fourth embodiment of the present disclosure.

The hybrid vehicle 320 according to the fourth embodiment shown in FIG. 10 includes planetary gears 330, 340 instead of the planetary gear 30 of the hybrid vehicle 20 as the planetary gear set, and includes a clutch CL2 and a brake BR2.

The planetary gear 330 is a single pinion planetary gear. The planetary gear 330 includes a sun gear 331, a ring gear 332, a plurality of pinion gears 333 and a carrier 334. The sun gear 331 is an external gear. The ring gear 332 is an internal gear. The plurality of pinion gears 333 are in mesh with the sun gear 331 and the ring gear 332. The carrier 334 supports the plurality of pinion gears 333 such that each pinion gear 333 is rotatable and revolvable. The rotor of the motor MG2 is connected to the sun gear 331. The crankshaft 26 of the engine 22 is connected to the ring gear 332. A drive shaft 336 coupled to the drive wheels 39*a*, 39*b* via the differential gear 38 and the gear mechanism 37 is connected to the carrier 334.

The planetary gear 340 is a single pinion planetary gear. The planetary gear 340 includes a sun gear 341, a ring gear 342, a plurality of pinion gears 343 and a carrier 344. The sun gear 341 is an external gear. The ring gear 342 is an internal gear. The plurality of pinion gears 343 are in mesh with the sun gear 341 and the ring gear 342. The carrier 344 supports the plurality of pinion gears 343 such that each pinion gear 343 is rotatable and revolvable. The rotor of the motor MG1 is connected to the sun gear 341. The drive shaft 336 is connected to the carrier 344.

The clutch CL2 connects the sun gear 331 of the planetary gear 330 and the rotor of the motor MG2 to the ring gear 342 of the planetary gear 340 or releases the connection therebetween. The brake BR2 fixes (connects) the ring gear 342 of the planetary gear 340 to the case 21 such that the ring gear 342 is non-rotatable, or releases the ring gear 342 from the case 21 such that the ring gear 342 is rotatable.

Figure 11:
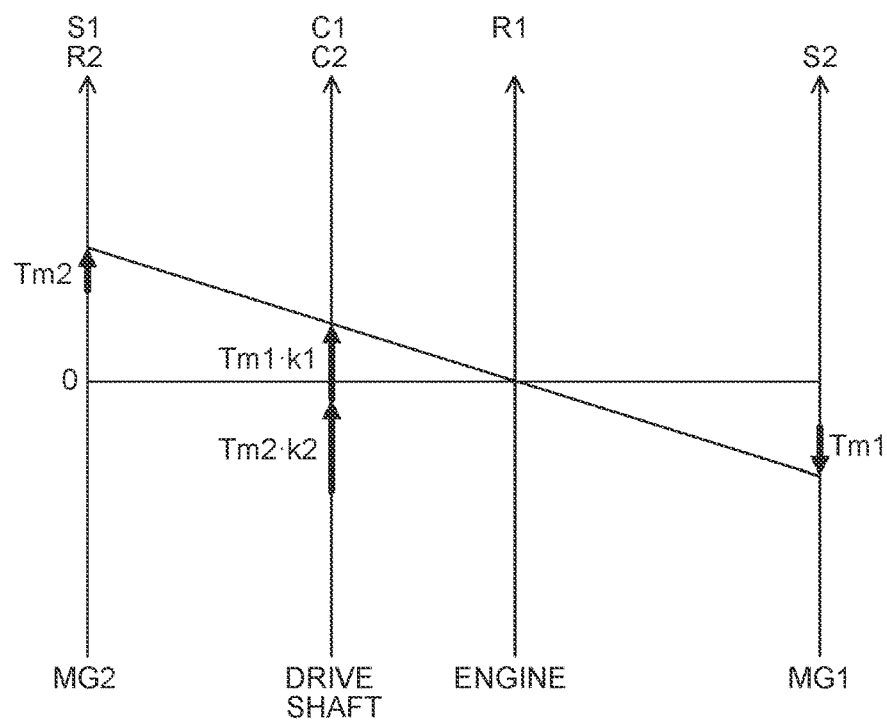
FIG. 11 is a view that illustrates an example of a nomograph of a planetary gear at the time when the hybrid vehicle travels in double-drive mode in a state where a clutch is set to an engaged state and a brake is set to a released state in the fourth embodiment.
Figure 12:
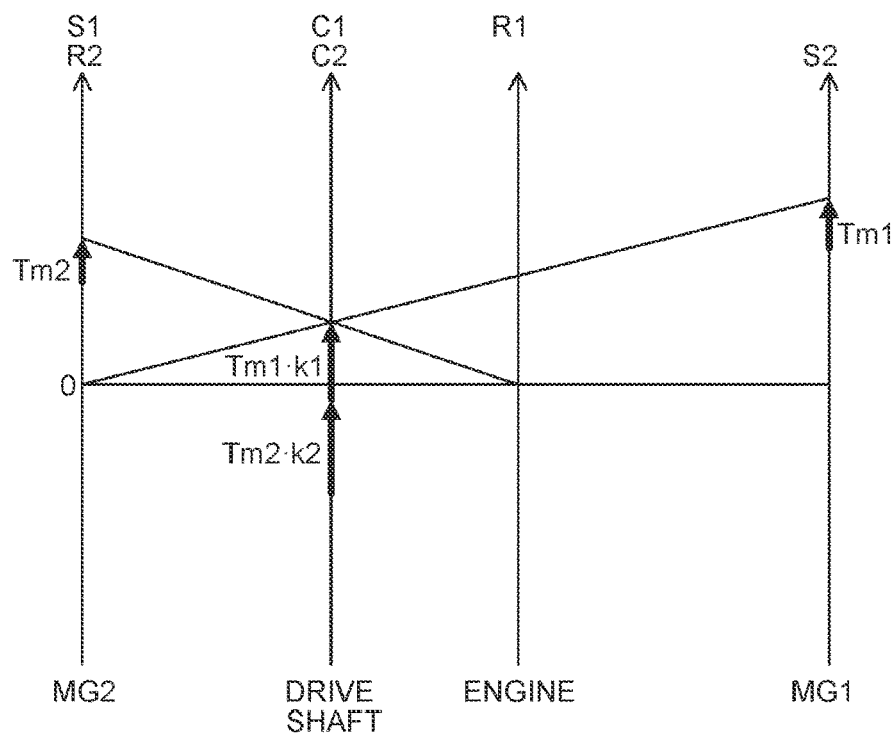
FIG. 12 is a view that illustrates an example of a nomograph of the planetary gear at the time when the hybrid vehicle travels in the double-drive mode in a state where the clutch is set to a released state and the brake is set to an engaged state in the fourth embodiment.

FIG. 11 is a view that shows an example of a nomograph of the planetary gears 330, 340 at the time when the hybrid vehicle 320 travels in the double-drive mode while the clutch CL2 is set to the engaged state and the brake BR2 is set to the released state. FIG. 12 is a view that illustrates an example of a nomograph of the planetary gears 330, 340 at the time when the hybrid vehicle 320 travels in the double-drive mode while the clutch CL2 is set to the released state and the brake BR2 is set to the engaged state. In FIG. 11 and FIG. 12, the S1 and R2-axis represents the rotation speed of the sun gear 331 of the planetary gear 330 or the rotation speed of the ring gear 342 of the planetary gear 340, which is the rotation speed Nm2 of the motor MG2, the C1 and C2-axis represents the rotation speed of the carrier 334 of the planetary gear 330 or the rotation speed of the carrier 344 of the planetary gear 340, which is the rotation speed of the drive shaft 336, the R1-axis represents the rotation speed of the ring gear 332 of the planetary gear 330, which is the rotation speed Ne of the engine 22, and the S2-axis represents the rotation speed of the sun gear 341 of the planetary gear 340, which is the rotation speed Nm1 of the motor MG1. In FIG. 11 and FIG. 12, the two wide-line arrows on the C1 and C2-axis respectively indicate a torque (Tm1×k1) that is output to the drive shaft 336 at the time when the torque Tm1 is output from the motor MG1 and a torque (Tm2×k2) that is output to the drive shaft 336 at the time when the torque Tm2 is output from the motor MG2. A conversion coefficient k1 is a coefficient for converting the torque Tm1 of the motor MG1 to the torque of the drive shaft 336. A conversion coefficient k2 is a coefficient for converting the torque Tm2 of the motor MG2 to the torque of the drive shaft 336.

In the case of FIG. 11, the clutch CL2 is set to the engaged state, so the rotation speed of the sun gear 331 of the planetary gear 330, which is the rotation speed Nm2 of the motor MG2, is the same as the rotation speed of the ring gear 342 of the planetary gear 340. Therefore, the planetary gears 330, 340 function as a so-called four element planetary gear set. In this case, in the double-drive mode, the torque Tm1 in the direction in which the rotation speed Nm1 of the motor MG1 is increased toward a negative side (downward direction in the graph) is output from the motor MG1 to the sun gear 341 of the planetary gear 340, and the torque Tm2 in the direction in which the rotation speed Nm2 of the motor MG2 is increased toward a positive side (upward direction in the graph) is output from the motor MG2 to the sun gear 331 of the planetary gear 330 and the ring gear 342 of the planetary gear 340. Thus, the hybrid vehicle is able to travel by using torque from the motor MG1 and the motor MG2 while the ring gear 332 (engine 22) of the planetary gear 330 is placed in the rotation stopped state.

In the case of FIG. 12, in the double-drive mode, the torque Tm1 in the direction in which the rotation speed Nm1 of the motor MG1 is increased toward a positive side (upward direction in the graph) is output from the motor MG1 to the sun gear 341 of the planetary gear 340, and the torque Tm2 in the direction in which the rotation speed Nm2 of the motor MG2 is increased toward a positive side (upward direction in the graph) is output from the motor MG2 to the sun gear 331 of the planetary gear 330 and the ring gear 342 of the planetary gear 340. Thus, the hybrid vehicle is able to travel by using torque from the motor MG1 and the motor MG2 while the ring gear 332 (engine 22) of the planetary gear 330 is placed in the rotation stopped state.

The correspondence relationship between the major elements of the embodiments and the major elements of the present disclosure described in the summary will be described. In each embodiment, the engine 22 is an example of the engine. The motor MG1 is an example of the first motor. The motor MG2 is an example of the second motor. The planetary gear 30 is an example of the planetary gear set. The one-way clutch CL1 is an example of the rotation restriction mechanism. The battery 50 is an example of the battery. The HV-ECU 70, the engine ECU 24 and the motor ECU 40 correspond to an example of the electronic control unit.

The correspondence relationship between the major elements of the embodiments and the major elements of the present disclosure described in the summary is not intended to limit the elements of the present disclosure described in the summary since each embodiment is an example for specifically illustrating a mode for carrying out the present disclosure, described in the summary. That is, the present disclosure described in the summary should be interpreted on the basis of the description in the summary, and each embodiment is merely a specific example of the present disclosure described in the summary.

The embodiments of the present disclosure are described above; however, the present disclosure is not limited to those embodiments. Of course, the present disclosure may be implemented in various forms without departing from the scope of the present disclosure.

The present disclosure is applicable to manufacturing industries of hybrid vehicles, or the like.

What is claimed is:

1. A hybrid vehicle comprising:
   an engine;
   a first motor;
   a second motor;
   a planetary gear set including at least one planetary gear, at least part of rotating elements of the at least one planetary gear being connected to the engine, the first motor, the second motor and a drive shaft coupled to an axle;
   a rotation restriction mechanism configured to restrict rotation of the engine;
   a battery configured to exchange electric power with the first motor and the second motor; and
   an electronic control unit configured to:
   (i) control, in one of a charge depleting mode and a charge sustaining mode, the engine, the first motor and the second motor such that the hybrid vehicle travels by using a required output for propelling the hybrid vehicle according to an accelerator operation, in any one of a hybrid drive mode, a single-drive mode and a double-drive mode, the hybrid drive mode being a mode in which the hybrid vehicle travels while the engine is operated by placing the engine in a rotating state, the single-drive mode being a mode in which the hybrid vehicle travels by using output from only the second motor in an electric drive mode in which the hybrid vehicle travels while the engine is placed in a rotation stopped state to cause the engine not to operate, and the double-drive mode being a mode in which the hybrid vehicle travels by using output from the first motor and the second motor in the electric drive mode,
   (ii) cause a drive mode to shift into the hybrid drive mode by starting the engine when a predetermined high response request is not being issued, when the required output becomes larger than a first threshold in the charge sustaining mode in the single-drive mode, and
   (iii) cause the drive mode to shift into the double-drive mode without starting the engine when the predetermined high response request is being issued, when the required output becomes larger than the first threshold in the charge sustaining mode in the single-drive mode.

2. The hybrid vehicle according to claim 1, wherein the electronic control unit is configured to cause the drive mode to shift into the hybrid drive mode, when the predetermined high response request is being issued in the charge sustaining mode in the electric drive mode, and when the required output becomes larger than a second threshold larger than the first threshold.

3. The hybrid vehicle according to claim 2, wherein
the second threshold is a value larger than a maximum double-drive output that is a maximum output outputtable to the drive shaft in the double-drive mode, and
the electronic control unit is configured to cause the drive mode to shift into the hybrid drive mode even when the required output is not larger than the second threshold, when the required output is larger than the first threshold and the predetermined high response request is being issued in the charge sustaining mode in the electric drive mode, and when the required output is larger than the maximum double-drive output.

4. The hybrid vehicle according to claim 2, wherein the electronic control unit is configured to cause the drive mode to shift into the hybrid drive mode even when the required output is not larger than the second threshold, when the required output is larger than the first threshold and the predetermined high response request is being issued in the charge sustaining mode in the electric drive mode, and when at least one of a condition that the hybrid vehicle is traveling on a predetermined low μ road, a condition that a slip due to wheel spin of a drive wheel has been detected, and a condition that slip reduction control for reducing an extent of the slip is being executed is satisfied.

* * * * *

UNITED STATES PATENT AND TRADEMARK OFFICE
CERTIFICATE OF CORRECTION

PATENT NO. : 10,246,074 B2
APPLICATION NO. : 15/345594
DATED : April 2, 2019
INVENTOR(S) : Keita Sato Page 1 of 1

It is certified that error appears in the above-identified patent and that said Letters Patent is hereby corrected as shown below:

In Column 6, Line 4, after "velocity", delete "cue" and insert --ωe--, therefor.

Signed and Sealed this
Fourteenth Day of May, 2019

Andrei Iancu
*Director of the United States Patent and Trademark Office*